(12) United States Patent
Zhu et al.

(10) Patent No.: US 10,003,486 B2
(45) Date of Patent: Jun. 19, 2018

(54) NON-ORTHOGONAL MULTIPLE ACCESS (NOMA) WIRELESS SYSTEMS AND METHODS

(71) Applicant: Intel IP Corporation, Santa Clara, CA (US)

(72) Inventors: Yuan Zhu, Beijing (CN); Hwan-Joon Eddy Kwon, Santa Clara, CA (US); Hyejung Jung, Palatine, IL (US); Utsaw Kumar, Santa Clara, CA (US); Jong-Kae J. K. Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 241 days.

(21) Appl. No.: 14/632,291

(22) Filed: Feb. 26, 2015

(65) Prior Publication Data

US 2015/0312074 A1  Oct. 29, 2015

Related U.S. Application Data

(60) Provisional application No. 61/985,383, filed on Apr. 28, 2014.

(51) Int. Cl.
*H04L 27/26* (2006.01)
*H04L 25/03* (2006.01)
(Continued)

(52) U.S. Cl.
CPC ........ *H04L 27/2627* (2013.01); *H04J 11/004* (2013.01); *H04L 1/0003* (2013.01);
(Continued)

(58) Field of Classification Search
None
See application file for complete search history.

(56) References Cited

U.S. PATENT DOCUMENTS

| 4,301,530 A | 11/1981 | Gutleber |
| 4,470,138 A | 9/1984 | Gutleber |

(Continued)

FOREIGN PATENT DOCUMENTS

EP  2712105 A1  3/2014

OTHER PUBLICATIONS

Yuya Saito ("Non-Othogonal Multiple Access (NOMA) for Future Radio Access"-In: 2013 IEEE 77th Vehicular Technology Conference (VTC Spring)).*

(Continued)

*Primary Examiner* — Jeffrey M Rutkowski
*Assistant Examiner* — Mehedi Aley
(74) *Attorney, Agent, or Firm* — Eschweiler & Potashnik, LLC

(57) ABSTRACT

Apparatuses and methods for Non-Orthogonal Multiple Access (NOMA) communication are discussed. An example Evolved NodeB (eNB) includes a memory, a processor, and a transmitter circuit. The processor evaluates an orthogonal multiple access (OMA) metric and a NOMA metric, generates a protocol instruction that indicates an OMA transmission or a NOMA transmission based on the metrics, and determines a first modulation and coding scheme (MCS) for a first UE and a second MCS for a second UE. The transmitter circuit receives the protocol instruction and transmits a first data signal and a first downlink control information (DCI) message associated with the first UE, and a second data signal and a second DCI message associated with the second UE. When the protocol instruction indicates NOMA transmission, the data signals are power multiplexed, the DCI messages indicate the data signals are transmitted via NOMA, and the first DCI message indicates the second MCS.

24 Claims, 14 Drawing Sheets

(51) Int. Cl.

| | | |
|---|---|---|
| H04W 76/04 | (2009.01) | |
| H04L 27/00 | (2006.01) | |
| H04J 11/00 | (2006.01) | |
| H04W 52/16 | (2009.01) | |
| H04W 52/34 | (2009.01) | |
| H04W 52/24 | (2009.01) | |
| H04W 52/42 | (2009.01) | |
| H04L 1/00 | (2006.01) | |
| H04L 27/34 | (2006.01) | |
| H04L 5/00 | (2006.01) | |
| H04L 27/02 | (2006.01) | |
| H04L 27/18 | (2006.01) | |
| H04B 7/0417 | (2017.01) | |
| H04W 52/12 | (2009.01) | |

(52) U.S. Cl.
CPC ......... *H04L 1/0009* (2013.01); *H04L 1/0015* (2013.01); *H04L 1/0026* (2013.01); *H04L 5/0028* (2013.01); *H04L 5/0046* (2013.01); *H04L 5/0092* (2013.01); *H04L 25/03898* (2013.01); *H04L 27/0012* (2013.01); *H04L 27/2608* (2013.01); *H04L 27/3488* (2013.01); *H04W 52/16* (2013.01); *H04W 52/241* (2013.01); *H04W 52/346* (2013.01); *H04W 52/42* (2013.01); *H04W 76/046* (2013.01); *H04W 76/27* (2018.02); *H04B 7/0417* (2013.01); *H04L 5/0023* (2013.01); *H04L 5/0053* (2013.01); *H04L 27/02* (2013.01); *H04L 27/18* (2013.01); *H04W 52/12* (2013.01)

(56) References Cited

U.S. PATENT DOCUMENTS

| | | | |
|---|---|---|---|
| 2007/0291634 A1 | 12/2007 | Kwon et al. | |
| 2015/0124902 A1 | 5/2015 | Goto et al. | |
| 2015/0341091 A1* | 11/2015 | Park | H04B 7/0456 375/267 |
| 2015/0382327 A1* | 12/2015 | Kishiyama | H04J 11/004 370/329 |
| 2016/0014785 A1 | 1/2016 | Benjebbour et al. | |
| 2016/0029350 A1* | 1/2016 | Kishiyama | H04W 16/28 370/329 |
| 2016/0219529 A1* | 7/2016 | Benjebbour | H04W 52/14 |
| 2016/0315727 A1* | 10/2016 | Lee | H04J 11/0069 |

OTHER PUBLICATIONS

Benjebbour, et al. "System-Level Performance of Downlink NOMA for Future LTE Enhancements." Globecom Workshops, Dec. 9-13, 2013.

Saito, et al. "Non-Orthogonal Multiple Access (NOMA) for Future Radio Access." Vehicular Technology Conference, Jun. 2-5, 2013.

Saito, et al. "System-Level Performance Evaluation of Downlink Non-Orthogonal Multiple Access." Personal Indoor and Mobile Radio Communications, Sep. 8-11, 2013.

International Search Report & Written Opinion of the International Searching Authority dated Jun. 19, 2015 for co-pending PCT Application No. PCT/US2015/022869.

Anass Benjebbour, et al.; "System-Level Performance of Downlink NOMA for Future LTE Enhancements"; DOCOMO Beijing Communications Laboratories Co., Ltd., Dec. 2013, p. 1-5.

"DOCOMO 5G White Paper, 5G Radio Access: Requirements, Concepts and Technologies"; NTT DOCOMO, Inc.; Jul. 2014, p. 1-13.

Anass Benjebbour, et al.; "Concept and Practical Considerations of Non-Orthogonal Multiple Access (NOMA) for Future Radio Access"; DOCOMO Beijing Communications Laboratories Co., Ltd., Nov. 2013, p. 1-5.

Peng Wang, et al.; "Comparison of Orthogonal and Non-Orthogonal Approaches to Future Wireless Cellular Systems"; University of Electronic Science and Technology of China, City University of Hong Kong, Kong Kong SAR, Sep. 2006, p. 1-6.

Yuya Saito, et al.; "Non-Orthogonal Multiple Access (NOMA) for Future Radio Access"; DOCOMO Beijing Communications Laboratories Co., Ltd., Jun. 2013, p. 1-5.

Yaser Barayan, et al.; "Performance Evaluation of Proportional Fairness Scheduling in LTE"; Proceedings of the World Congress on Engineering and Computer Science, Oct. 2013, vol. II, p. 1-6.

International Preliminary Report on Patentability dated Nov. 1, 2016 International Application No. PCT/US2015/022869.

"Network assistance for advanced receivers." Agenda item: 7.2.9.2. Source: NSN, Nokia. 3GPP TSG RAN WG1 Meeting #76, Prague, Czech Republic, Feb. 10-14, 2014. R1-140576. 5 pages.

Extended European Search Report dated Nov. 24, 2017 for Application No. 15786372.1.

"3rd Generation Partnership Project; Technical Specificatian Group Radio Access Network; Evolved Universal Terrestrial Radio Access (E-UTRA); Physical layer procedures (Release 12)." 3GPP TS 38.213 V12.0.0 (Dec. 2013); 3GPP Advanced Lte. 186 pages.

* cited by examiner

FIG. 6

Signaling for UE2

| Receiver Type | Modulation Order | Additional Signaling |
|---|---|---|
| MMSE | QPSK | No |
| | 16QAM/64QAM/256QAM | $p_2$ |
| ML | Any modulation | $p_2$ and the modulation order of the other UE in the same NOMA pair. The power scaling of the other UE in the same NOMA pair is assumed to be $p_1 = 1 - p_2$. |

| Number of antenna ports at eNodeB | Number of bits for NOMA information for UE1 |
|---|---|
| 2 | 1 |
| 4 | 0 |

FIG. 7A

| Content of UE1 NOMA information field for 2 antenna ports | |
|---|---|
| One codeword: Codeword 0 enabled, Codeword 1 disabled | Two codewords: Codeword 0 enabled, Codeword 1 enabled |
| Bit field mapped to index / Message | Bit field mapped to index / Message |
| 0 / reserved | 0 / 2 layers: precoder cycling with large delay cyclic delay diversity (CDD) |
| 1 / reserved | 1 / 2 layers: Transmit Diversity for both code words |

FIG. 7B

Content of precoding information field for 4 antenna ports

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | reserved | 2 | 4 layers: precoder cycling with large delay CDD |
| 3 | reserved | 3 | 4 layers: Transmit diversity for transport block 1 with scaling $\sqrt{p_1}$ and transport block 2 with scaling $\sqrt{p_2}$ |

Content of precoding information field for 2 antenna ports

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 2 layers: Transmit diversity | 0 | 2 layers: Precoding corresponding to precoder matrix $\frac{1}{2}\begin{bmatrix}1 & 1\\1 & -1\end{bmatrix}$ |
| 1 | 1 layer: Precoding corresponding to precoding vector $[1\ \ 1]^T/\sqrt{2}$ | 1 | 2 layers: Precoding corresponding to precoder matrix $\frac{1}{2}\begin{bmatrix}1 & 1\\j & -j\end{bmatrix}$ |
| 2 | 1 layer: Precoding corresponding to precoder vector $[1\ \ -1]^T/\sqrt{2}$ | 2 | 2 layers: Precoding according to the latest PMI report on PUSCH, using the precoder(s) indicated by the reported PMI(s) |
| 3 | 1 layer: Precoding corresponding to precoder vector $[1\ \ j]^T/\sqrt{2}$ | 3 | 2 layers: Transmit diversity for transport block 1 with scaling $\sqrt{p_1}$ and transport block 2 with scaling $\sqrt{p_2}$ |
| 4 | 1 layer: Precoding corresponding to precoder vector $[1\ \ -j]^T/\sqrt{2}$ | 4 | 1 layer: Precoding corresponding to precoding vector $[1\ \ 1]^T\sqrt{p_1}$ and $[1\ \ 1]^T\sqrt{p_2}$ for the first and second transport block |
| 5 | 1 layer: Precoding according to the latest PMI report on PUSCH, using the precoder(s) indicated by the reported PMI(s), if RI=2 was reported, using 1st column multiplied by $\sqrt{2}$ of all precoders implied by the reported PMI(s) | 5 | 1 layer: Precoding corresponding to precoding vector $[1\ \ -1]^T\sqrt{p_1}$ and $[1\ \ -1]^T\sqrt{p_2}$ for the first and second transport block |
| 6 | 1 layer: Precoding according to the latest PMI report on PUSCH, using the precoder(s) indicated by the reported PMI(s), if RI=2 was reported, using 2nd column multiplied by $\sqrt{2}$ of all precoders implied by the reported PMI(s) | 6 | 1 layer: Precoding corresponding to precoding vector $[1\ \ j]^T\sqrt{p_1}$ and $[1\ \ j]^T\sqrt{p_2}$ for the first and second transport block |
| 7 | reserved | 7 | 1 layer: Precoding corresponding to precoding vector $[1\ \ -j]^T\sqrt{p_1}$ and $[1\ \ -j]^T\sqrt{p_2}$ for the first and second transport block |

| Content of precoding information field for 4 antenna ports ||||
|---|---|---|---|
| One codeword: Codeword 0 enabled, Codeword 1 disabled || Two codewords: Codeword 0 enabled, Codeword 1 enabled ||
| Bit field mapped to index | Message | Bit field mapped to index | Message |
| 0 | 4 layers: Transmit diversity | 0 | 2 layers: TPMI=0 |
| 1 | 1 layer: TPMI=0 | 1 | 2 layers: TPMI=1 |
| 2 | 1 layer: TPMI=1 | ⋮ | ⋮ |
| ⋮ | ⋮ | 15 | 2 layers: TPMI=15 |
| 16 | 1 layer: TPMI=15 | 16 | 2 layers: Precoding according to the latest PMI report on PUSCH using the precoder(s) indicated by the reported PMI(s) |
| 17 | 1 layer: Precoding according to the latest PMI report on PUSCH using the precoder(s) indicated by the reported PMI(s) | 17 | 3 layers: TPMI=0 |
| 18 | 2 layers: TPMI=0 | 18 | 3 layers: TPMI=1 |
| 19 | 2 layers: TPMI=1 | ⋮ | ⋮ |
| ⋮ | ⋮ | 32 | 3 layers: TPMI=15 |
| 33 | 2 layers: TPMI=15 | 33 | 3 layers: Precoding according to the latest PMI report on PUSCH using the precoder(s) indicated by the reported PMI(s) |
| 34 | 2 layers: Precoding according to the latest PMI report on PUSCH using the precoder(s) indicated by the reported PMI(s) | 34 | 4 layers: TPMI=0 |
| 35 – 63 | reserved | 35 | 4 layers: TPMI=1 |
|  |  | ⋮ | ⋮ |
|  |  | 49 | 4 layers: TPMI=15 |
|  |  | 50 | 4 layers: Precoding according to the latest PMI report on PUSCH using the precoder(s) indicated by the reported PMI(s) |

FIG. 10A

Content of precoding information field for 4 antenna ports

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| | | 51 | 4 layers: Transmit diversity for transport block 1 with scaling $\sqrt{p_1}$ and transport block 2 with scaling $\sqrt{p_2}$ |
| | | 52 | 1 layer: TPMI=0, with scaling $\sqrt{p_1}$ for transport block 1 and scaling $\sqrt{p_2}$ for transport block 2 |
| | | 53 | 1 layer: TPMI=2, with scaling $\sqrt{p_1}$ for transport block 1 and scaling $\sqrt{p_2}$ for transport block 2 |
| | | 54 | 1 layer: TPMI=3, with scaling $\sqrt{p_1}$ for transport block 1 and scaling $\sqrt{p_2}$ for transport block 2 |
| | | 55 | 1 layer: TPMI=4, with scaling $\sqrt{p_1}$ for transport block 1 and scaling $\sqrt{p_2}$ for transport block 2 |
| | | 56 | 1 layer: TPMI=5, with scaling $\sqrt{p_1}$ for transport block 1 and scaling $\sqrt{p_2}$ for transport block 2 |
| | | 57 | 1 layer: TPMI=6, with scaling $\sqrt{p_1}$ for transport block 1 and scaling $\sqrt{p_2}$ for transport block 2 |
| | | 58 | 1 layer: TPMI=7, with scaling $\sqrt{p_1}$ for transport block 1 and scaling $\sqrt{p_2}$ for transport block 2 |
| | | 59 | 1 layer: TPMI=8, with scaling $\sqrt{p_1}$ for transport block 1 and scaling $\sqrt{p_2}$ for transport block 2 |
| | | 60 | 1 layer: TPMI=9, with scaling $\sqrt{p_1}$ for transport block 1 and scaling $\sqrt{p_2}$ for transport block 2 |
| | | 61 | 1 layer: TPMI=10, with scaling $\sqrt{p_1}$ for transport block 1 and scaling $\sqrt{p_2}$ for transport block 2 |
| | | 62 | 1 layer: TPMI=11, with scaling $\sqrt{p_1}$ for transport block 1 and scaling $\sqrt{p_2}$ for transport block 2 |
| | | 63 | reserved |

FIG. 10B

Modulation order of code word 2 for UE1

| Bit field pattern | Modulation Order |
|---|---|
| '00' | QPSK |
| '01' | 16QAM |
| '10' | 64QAM |
| '11' | 256QAM |

FIG. 11

Encoding of differential NOMA CQI

| Bit field pattern for NOMA diff CQI | Differential CQI value |
|---|---|
| '00' | -2 |
| '01' | -3 |
| '10' | -4 |
| '11' | -5 |

FIG. 12

NON-ORTHOGONAL MULTIPLE ACCESS (NOMA) WIRELESS SYSTEMS AND METHODS

REFERENCE TO RELATED APPLICATIONS

This application claims the benefit of U.S. Provisional Application No. 61/985,383 filed Apr. 28, 2014, entitled "NOMA FOR FUTURE WIRELESS SYSTEMS", the contents of which are herein incorporated by reference in their entirety.

FIELD

The present disclosure relates to multiple access radio technology, and more specifically, to enabling non-orthogonal multiple access transmission by transmitting power multiplexed data signals (e.g., downlink) and control signals that facilitate decoding the power multiplexed data signals.

BACKGROUND

Conventional third generation (3G) and fourth generation (4G) wireless systems use radio access technologies (RATs) that employ orthogonal multiple access (OMA) as multiple access techniques, such as code division multiple access (CDMA) in 3G and orthogonal frequency division multiple access (OFDMA) in 4G. OMA techniques involve transmitting to multiple user equipments (UEs) with full power, but a split bandwidth, for example, via the frequency division of OFDMA, the code division of CDMA, or time division (e.g., in time division multiple access (TDMA)). However, mobile data traffic is expected to increase exponentially over the next decade, outstripping the ability of OMA technologies to meet mobile data traffic demands.

BRIEF DESCRIPTION OF THE DRAWINGS

FIG. 6 is a table of example control signaling for a second user equipment (UE2) with different types of MIMO receivers for various modulation orders according to various aspects described herein.

FIG. 7A is a table indicating example numbers of bits for NOMA information for UE1 according to various aspects described herein.

FIG. 7B is a table indicating example content of the NOMA information field for UE1 when the eNB is configured with 2 antenna ports according to various aspects described herein.

FIG. 8 is a table indicating example signaling of precoding information content for four antenna ports according to various aspects described herein.

FIG. 9 is a table indicating example signaling of precoding information content for two antenna ports according to various aspects described herein.

FIG. 10A is a first portion of a table indicating example signaling of precoding information content for four antenna ports according to various aspects described herein.

FIG. 10B is a second portion of a table indicating example signaling of precoding information content for four antenna ports according to various aspects described herein.

FIG. 11 is a table of example signaling of the modulation order of code word 2 for UE1 according to various aspects described herein.

FIG. 12 is a table of example encoding of differential NOMA channel quality indicator information according to various aspects described herein.

DETAILED DESCRIPTION

Figure 1:
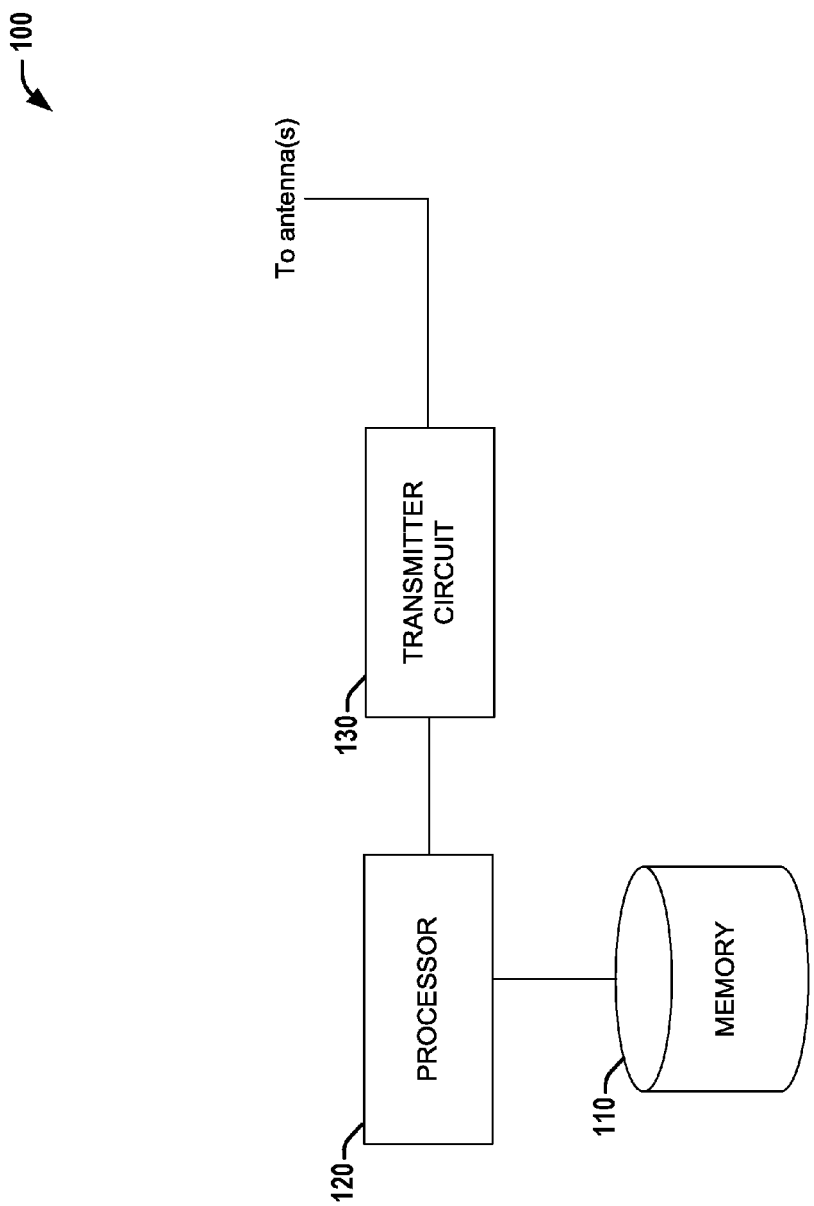
FIG. 1 is a block diagram of a system that facilitates NOMA communication with a plurality of user equipments (UEs) according to various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In contrast to orthogonal multiple access (OMA) systems, in a non-orthogonal multiple access (NOMA) system, multiple users share the same frequency and time resources. Instead, separation of user equipments (UEs) can be achieved via smart power allocation at the transmitter side and advanced processing at the receiver side in NOMA systems. Simulations of system level results have indicated that NOMA can offer ~30% throughput gain over conventional OMA systems.

Referring to FIG. 1, illustrated is a block diagram of a system 100 that facilitates NOMA communication with a plurality of user equipments (UEs) according to various aspects described herein. System 100 can include a memory 110, a processor 120, and a transmitter circuit 130. In various aspects, system 100 can be included within an Evolved Universal Terrestrial Radio Access Network (E-UTRAN) Node B (Evolved Node B, eNodeB, or eNB).

Memory 110 can store data, executable instructions, and/or other information employed by system 100.

Processor 120 can (e.g., by executing executable instructions stored by memory 110) evaluate an orthogonal multiple access (OMA) metric and a NOMA metric of a plurality of UEs. The OMA metric and the NOMA metric can each be a measure of expected data throughput associated with the plurality of UEs in the respective modes (OMA transmission and NOMA transmission). In one example, both the OMA metric and the NOMA metric can be based on the proportional fairness metric, or some other metric that is a function of expected throughput. In aspects, an individual OMA metric can be determined for each of the plurality of UEs assuming OMA transmission, and the OMA metric can be the best individual OMA metric (e.g., highest, etc.) of the individual OMA metrics. In further aspects, processor 120 can be configured to group the plurality of UEs into pairs and to determine a pairwise NOMA metric for each pair assuming NOMA transmission (e.g., with the pairwise NOMA metric as the sum of an individual NOMA metric for each UE in the pair), with the NOMA metric being the best pairwise NOMA metric (e.g., highest, etc.) of the pairwise NOMA metrics. UEs can be grouped into pairs in a variety of manners, such as by considering all possible pairings, or only a subset of pairings. As NOMA transmission is most effective when paired UEs have differing channel gain, UEs can be grouped into pairs based on differing channel gain between the UEs of a pair (e.g., as determined based on received signal-to-interference-plus-noise ratios (SINRs), etc.), and pairwise NOMA metrics can be determined only for those grouped pairs. In each pair of UEs for potential NOMA transmission, the UE with the higher channel gain (e.g., higher SINR, etc.) is referred to herein as the first UE (or UE1), while the UE with the lower channel gain (e.g., lower SINR, etc.) is referred to herein as the second UE (or UE2). UEs can be grouped into pairs on a continuous basis (e.g., for every sub-frame, etc.) or an intermittent basis (e.g., at various time intervals, based on changed conditions (e.g., received SINRs), etc.), which can be based on channel conditions (e.g., channel gains of the plurality of UEs as estimated via SINRs, etc.), which may change the designations of first UEs and second UEs as discussed herein (e.g., a first UE may become a second UE, or may be paired with a different second UE, etc.).

Based on the evaluated OMA metric and NOMA metric, processor 120 can generate a protocol instruction that indicates an OMA transmission or a NOMA transmission (e.g., which can occur for each sub-frame in various aspects; or less frequently, for example, wherein a previous one of OMA transmission or NOMA transmission is continued until indicated otherwise). For example, when the NOMA metric indicates superior throughput, a NOMA transmission can be indicated, and when the OMA metric indicates superior throughput, an OMA transmission can be indicated. As with other instructions and signals indicating information, etc., as discussed herein, the protocol instruction can indicate the OMA transmission or the NOMA transmission either explicitly (for example, by including an indicator such as one or more bits, symbols, etc. that designate the OMA transmission or NOMA transmission) or implicitly. For example, an implicit indication may be indicated by including or omitting information such that, based on the inclusion or omission, the OMA transmission or the NOMA transmission can be determined based on the protocol instruction, e.g., by including (or, alternatively, omitting) additional information for the NOMA transmission, the NOMA transmission can be determined from the inclusion of the additional information (or, alternatively, the OMA transmission can be determined from the omission of the additional information), vice versa, etc.

Processor 120 can also determine characteristics of the first and second UEs or first and second data signals, and alter or generate the first and/or second control signals based on the determined characteristics. For example, the first and/or second control signals can indicate a power allocation ratio when the associated UE employs a multiple input multiple output (MIMO) receiver that requires channel amplitude information, or when a modulation and coding scheme (MCS) of the associated data signal has a higher modulation order than four (quadrature phase shift keying (QPSK)). In another example, the type of interference cancellation (e.g., symbol level, codeword level) employed by the first UE can significantly affect the content of the first data signal, as explained in greater detail below.

Transmitter circuit 130 is configured to couple to at least one antenna. Transmitter circuit 130 receives the protocol instruction that indicates the OMA transmission or the NOMA transmission, and transmits a first data signal and a first control signal associated with a first UE (UE1), and a second data signal and a second control signal associated with a second UE (UE2) in either OMA or NOMA, although, as discussed herein, the content and/or manner of transmission may vary between OMA and NOMA. In Long Term Evolution (LTE) embodiments, the first data signal and the second data signal can be transmitted via a Physical Downlink Shared Channel (PDSCH), and the first control signal and the second control signal can be transmitted as Downlink Control Information (DCI) messages via a Physical Downlink Control Channel (PDCCH). Although, in general, the transmitter circuit 130 can transmit data and control signals to one or more pairs of UEs with each pair of UEs comprising a first UE and a second UE, the operation is substantially similar for each pair, thus, for ease of illustration, only a single pair of UEs (the first UE and the second UE) is discussed. As used herein, the first UE (UE1) has a higher channel gain (e.g., as estimated via a higher reported SINR) than the second UE (UE2). In the event of an unpaired UE, for NOMA operation, the unpaired UE can be regarded as a second UE, with a second data signal transmitted thereto without being power multiplexed with a first data signal, because in NOMA operation, as discussed in greater detail herein, the second UE treats the first data signal as noise in decoding the second data signal, thus the second UE will be able to decode the second data signal even in the absence of a first data signal.

In response to the protocol instruction indicating OMA operation, the transmitter circuit 130 can transmit the first data signal, first control signal, second data signal, and second control signal via conventional techniques via any OMA RAT, depending on the embodiment.

In response to the protocol instruction indicating NOMA operation, the transmitter circuit 130 can power multiplex the first and second data signals via NOMA as discussed in greater detail herein (e.g., with the first data signal having a transmit power scaling factor $p_1$ and the second data signal having a transmit power scaling factor $p_2$, wherein $p_1+p_2=1$ and $p_1<p_2$ (the second data signal is allocated a higher transmit power because the second UE has a lower channel gain)). Also in response to the protocol instruction indicating NOMA operation, the first control signal and the second control signal indicate the first and second data signals are transmitted via NOMA (either explicitly (e.g., by including an indicator (e.g., a bit, etc.) that specifies that the first and second data signals are transmitted via NOMA) or implicitly (e.g., by including or omitting information such that a receiving UE (e.g., UE1 or UE2) can determine from the inclusion or omission that the first and second data signals are transmitted via NOMA)). In various aspects, transmitter circuit 130 can employ, in connection with either an OMA transmission or a NOMA transmission, any of a number of different transmission modes that receiving UEs are configured for, such as transmit diversity, spatial multiplexing, etc.

The first control signal and the second control signal can include sufficient information (e.g., via explicit or implicit indication) for the first UE and the second UE to decode, respectively, the first data signal and the second data signal, as discussed in greater detail herein.

For the second UE, the processor 120 can determine a modulation and coding scheme (MCS) for the second data signal (e.g., based at least in part on one or more of the SINR of the second UE, characteristics of the second UE (e.g., of receiver(s) of the second UE), or other factors, such as those discussed herein (e.g., MCS restrictions, etc.)). In response to the MCS for the second data signal including amplitude modulation or amplitude-shift keying (e.g., 16QAM, 64QAM, 256QAM, etc.), the second control signal can indicate (e.g., explicitly or implicitly, as with all indicating discussed herein) the power scaling factor of the second data signal. Additionally, the processor 120 can determine a receiver type of the second UE (e.g., maximum likelihood (ML) or minimum mean squared error (MMSE)). In response to a determination that the receiver type of the second UE is a maximum likelihood receiver type, the second control signal can indicate the power scaling factor of the second data signal and a modulation order (or MCS) of the first data signal.

For the first UE, the processor 120 can determine an interference cancellation (IC) level employed by the first UE (e.g., codeword level IC, symbol level IC, etc.). Depending on the determined IC level of the first UE, the first control signal can indicate different information, and characteristics of the first and second data signals can be employed to facilitate transmission.

For example, if the first UE employs symbol level IC as its interference cancellation level, the first control signal can indicate a modulation order of the second data signal (e.g, as determined by processor 120).

If the first UE employs codeword level IC as its interference cancellation level, the first data signal and the second data signal can be scheduled to a common set of resources (e.g., a common set of physical resource blocks). Additionally, for codeword level IC, the processor 120 can determine a MCS of the second data signal, and the first control signal can indicate the MCS of the second data signal. Processor 120 can also determine an MCS of the first data signal, and, if the MCS of the first data signal includes amplitude modulation or amplitude-shift keying (e.g., a higher modulation order than four (quadrature phase shift keying (QPSK))), the first control signal can indicate the power scaling factor of the first data signal. If the first UE employs codeword level IC, the processor 120 can determine the MCS of the second data signal and the first control signal can indicate the MCS of the second data signal. In various embodiments, for codeword level IC, the processor 120 can determine an identifier of the second UE, and the first control signal can indicate the identifier of the second UE. In embodiments where the first control signal indicates the identifier of the second UE, this can be done in a variety of ways as discussed herein, such as via a pre-defined identifier of a plurality of pre-defined identifiers stored at the first UE (e.g., by indicating that, of n identifiers stored at the first UE, the second UE has the 2nd identifier, etc.).

Figure 2:
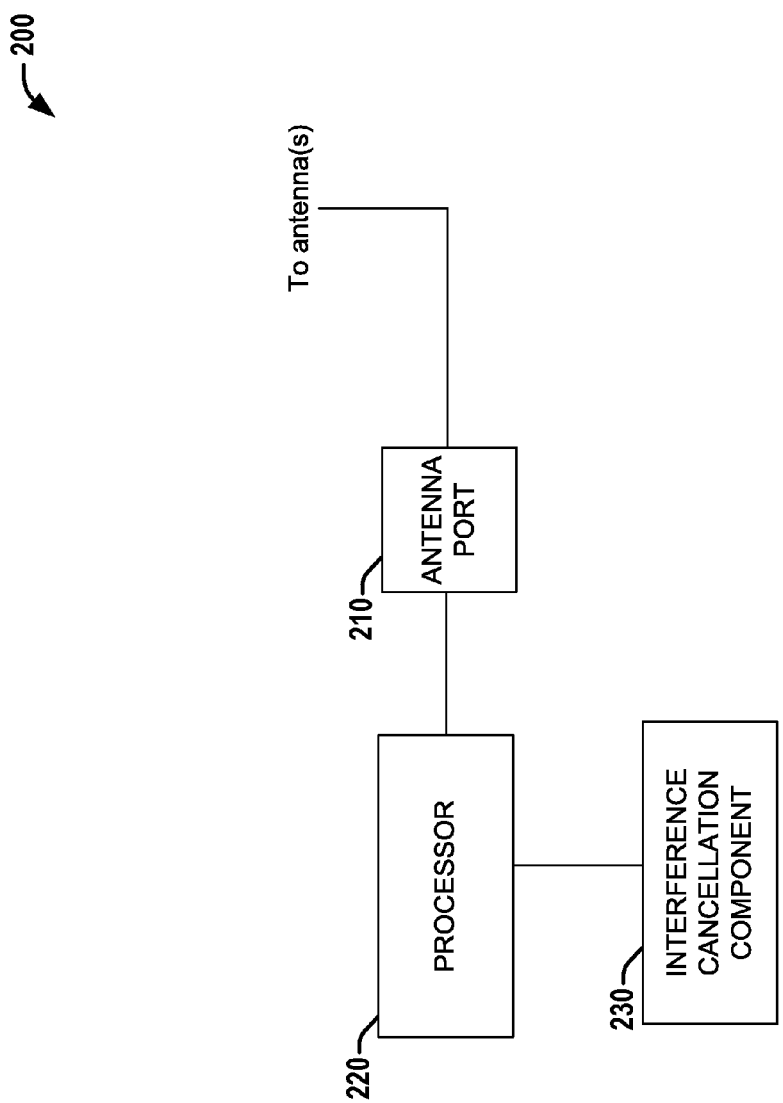
FIG. 2 is a block diagram of a system that facilitates NOMA communication with an Evolved NodeB (eNodeB or eNB) according to various aspects described herein.

Referring to FIG. 2, illustrated is a block diagram of a system 200 that facilitates NOMA communication with an Evolved NodeB (eNodeB or eNB) according to various aspects described herein. System 200 includes an antenna port 210, a processor 220, and an interference cancellation component 230. In various aspects, system 200 can be included within a user equipment (UE), for example, with system 200 (or portions thereof) within a receiver circuit or transceiver circuit of a UE. Additional details of a UE according to one embodiment are provided in FIG. 13 and discussed in greater detail below.

Antenna port 210 is configured to couple to at least one antenna, and antenna port 210 can receive a control signal and a data transmission that includes a first data signal and a second data signal. Although, in general, antenna port 210 will receive a plurality of control signals (e.g., a first control signal and a second control signal as discussed herein, as well as additional potential control signals), only one of those control signals (referred to as "the control signal") contains control signaling for system 200.

Processor 220 can determine, based on the control signal, whether the data transmission is an OMA transmission or a NOMA transmission. If processor 220 determines the data transmission is a NOMA transmission, processor 220 further determines whether the control signal indicates a first reception protocol (e.g., wherein a UE comprising system 200 is a first UE) or a second reception protocol (e.g., wherein a UE comprising system 200 is a second UE). Additionally, when the data transmission is a NOMA transmission, the processor 220 decodes the second data signal, regardless of whether the control signal indicates the first or the second reception protocol.

If the control signal indicates the second reception protocol, the processor 220 can designate the decoded second data signal as a received data signal associated with the system 200. Under the second reception protocol, the interference cancellation component 230 need not be employed. Accordingly, in various aspects described herein, NOMA communications can be transmitted to a pair of UEs where only the first UE includes an interference cancellation component 230, if possible given the channel conditions (e.g., the first UE has sufficient channel gain to decode the second data signal, subtract the second data signal, and decode the first data signal).

If the control signal indicates the first reception protocol, the interference cancellation component 230 subtracts the decoded second data signal from the transmission to obtain the first data signal, and the processor 220 decodes the first data signal as the received data signal associated with system 200.

As described herein, the control signal indicates (e.g., explicitly or implicitly) sufficient information for the system 200 to decode the second data signal and, under the first reception protocol, to decode the first data signal, as well. For example, depending on the modulation order or MCS of the second data signal (e.g., if 16QAM or higher, etc.), the control signal can indicate a power scaling factor of the second data signal. In various aspects described herein, the control signal can indicate the modulation order or MCS of the second data signal under either the second reception protocol or the first reception protocol.

Additionally, interference cancellation component 230 can employ either codeword level interference cancellation or symbol level interference cancellation (IC). Depending on the IC level of IC component 230, the control signal may indicate different information under the first reception protocol. For example, if codeword level IC is employed, the control signal can indicate a device identifier associated with the second data signal. Alternatively, processor 220 can attempt to decode the second data signal according to each of a plurality of device identifiers (e.g., 3 or 4, etc.), and determine that the second data signal is decoded based on passing a cyclic redundancy check (CRC).

Further, depending on the reception protocol, system 200 may transmit different information. For example, under the first reception protocol, the processor 220 can determine a NOMA channel quality indicator (CQI) based on the NOMA transmission and subtraction of the decoded second data signal, and the antenna port 210 can transmit the NOMA CQI to the eNB.

Figure 3:
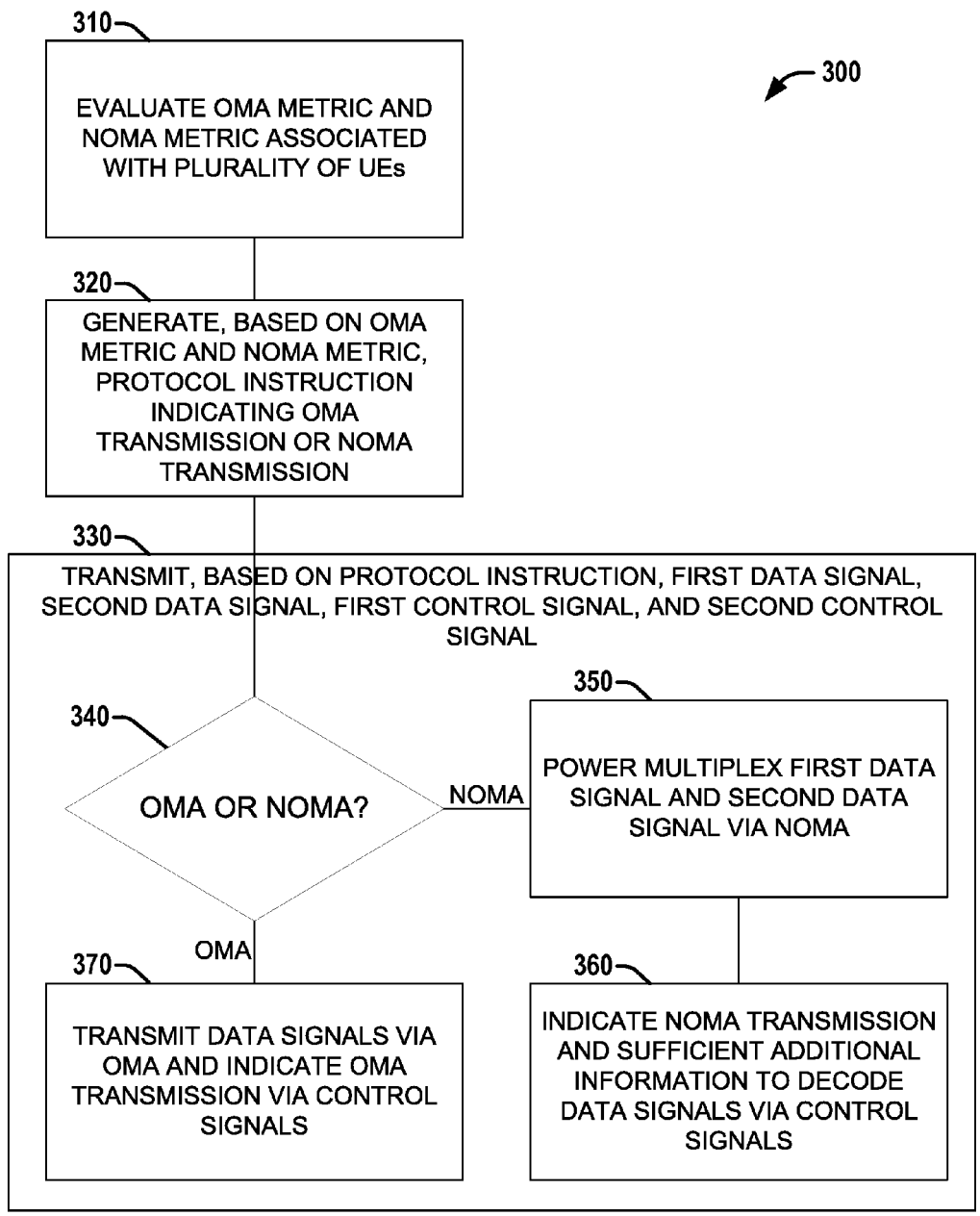
FIG. 3 is a flow diagram of a method that facilitates NOMA communication with a plurality of UEs according to various aspects described herein.

Referring to FIG. 3, illustrated is a flow diagram of a method 300 that facilitates NOMA communication with a plurality of UEs according to various aspects described herein. In various aspects, method 300 can be implemented via an eNodeB, for example, a system such as that illustrated in FIG. 1. Method 300 can include, at 310, evaluating an OMA metric and a NOMA metric, wherein both the OMA metric and the NOMA metric are associated with a plurality of UEs. The metrics can be as described herein, such as performance metrics to determine potential data throughput in OMA communication and NOMA communication. At 320, based on the OMA metric and the NOMA metric, method 300 can include generating a protocol instruction that indicates an OMA transmission or a NOMA transmission. At 330, method 300 includes transmitting, based on the protocol instruction, a first data signal and a first control signal associated with a first UE of the plurality of UEs, and a second data signal and a second control signal associated with a second UE of the plurality of UEs, where the second UE has a lower channel gain than the first UE. Act 330 can include acts 340-370 of method 300, as the content and/or manner of transmission of the first and second data signals and first and second control signals can vary, depending on whether the first and second data signals are transmitted via OMA or NOMA.

As indicated at 340, the transmitted signals can depend on whether the protocol instruction indicated an OMA transmission or a NOMA transmission. If the protocol instruction indicates a NOMA transmission, at 350, the first data signal and the second data signal are power multiplexed via NOMA. At 360, the first control signal and the second control signal indicate that the first data signal and the second data signal are transmitted via NOMA. Additionally, the first control signal and the second control signal include sufficient information to decode the NOMA transmission of the first data signal and the second data signal. If the protocol instruction indicates a NOMA transmission, information that can be indicated via the first control signal and/or the second control signal is discussed herein. For example, depending on the MCS or receiver type of the second UE, the second control signal can indicate a power scaling factor of the second data signal. The first control signal can indicate a power scaling factor of the first data signal and/or can indicate an MCS of the second data signal and/or an identifier of the second UE. Additional information that can be indicated and specific ways of indicating such information is discussed herein.

On the other hand, if the protocol instruction indicates an OMA transmission, at 370, the first and second data signals are transmitted via OMA (according to any of a variety of RATs), and the OMA transmission can be indicated via the first control signal and the second control signal.

Figure 4:
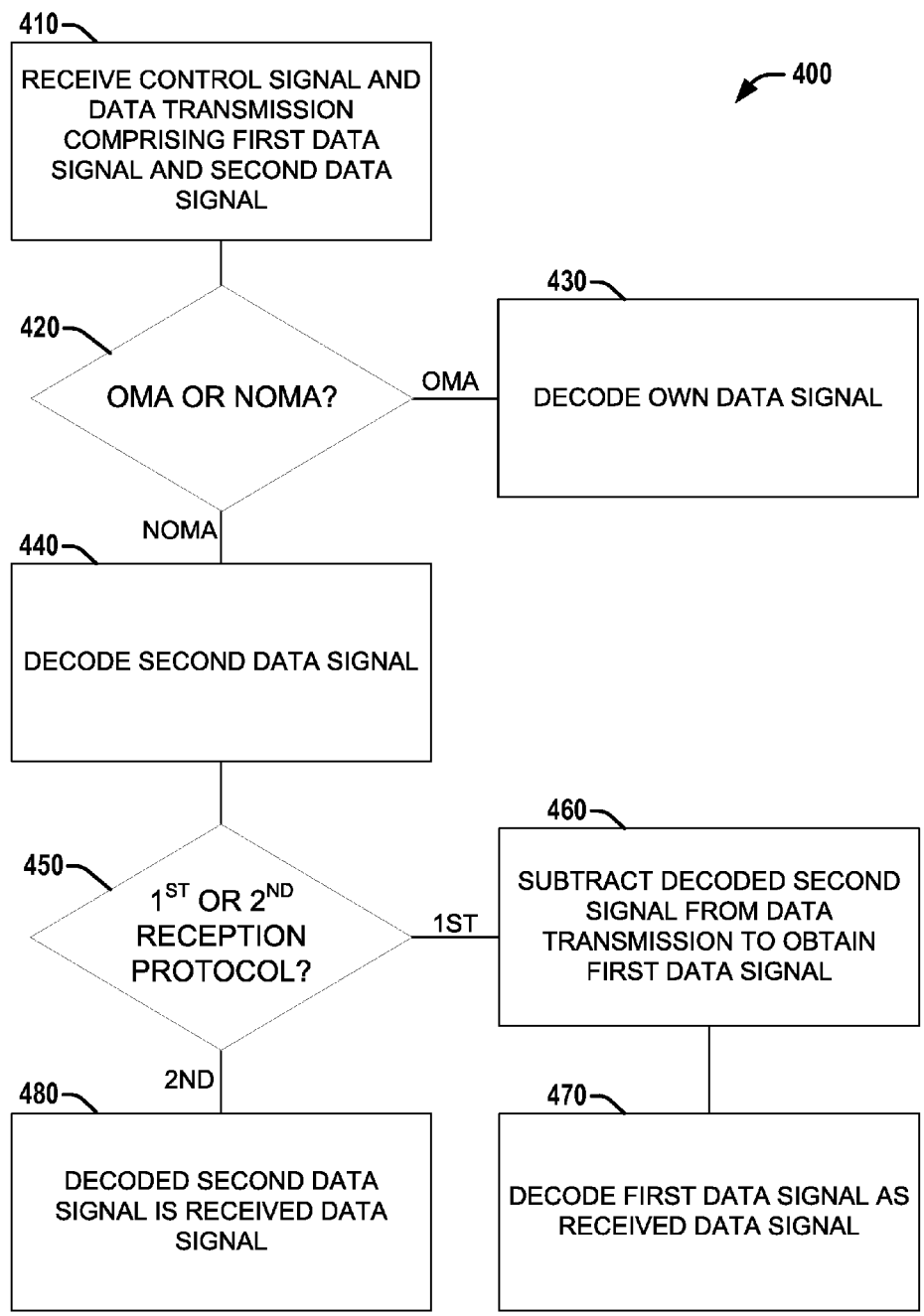
FIG. 4 is a flow diagram of a method that facilitates NOMA communication with an eNodeB according to various aspects described herein.

Referring to FIG. 4, illustrated is a flow diagram of a method 400 that facilitates NOMA communication with an eNodeB according to various aspects described herein. In various aspects, method 400 can be implemented via a UE, for example, via a receiver circuit or transceiver circuit of a UE. Method 400 can include, at 410, receiving a control signal and a data transmission that includes a first data signal and a second data signal. At 420, whether the data transmission is an OMA transmission or a NOMA transmission can be determined based on the control signal. If the data transmission is an OMA transmission, at 430, a received data signal of the first data signal or the second data signal is decoded based on the control signal.

If the transmission is a NOMA transmission, the first and second data signals are power multiplexed, with the first data signal having a lower transmitted (and received) power. If the transmission is a NOMA transmission, at 440, the second (higher power) data signal is decoded, regardless of whether the UE associated with or implementing method 400 is the first UE or the second UE. At 450, a determination is made as to whether the control signal indicates a first reception protocol (for a first UE, having a higher channel gain) or a second reception protocol (for a second UE, having a lower channel gain).

If the control signal indicates the first reception protocol, at 460, the UE implementing method 400 is the first UE, and the decoded second data signal is subtracted from the data transmission to obtain the first data signal, and at 470, the first data signal is decoded as the received data signal. If the control signal indicates the second reception protocol, at 460, the UE implementing method 400 is the second UE, and the decoded second data signal is designated as the received data signal.

What follows are example details of potential implementations of aspects described herein, as an extension of current Long Term Evolution-Advanced (LTE-A) specifications. Although specific details are provided, these are solely for the purposes of illustrating principles discussed herein, and not to limit the scope of the disclosure. For example, although specific examples are provided regarding how certain information can be signaled, this information can be signaled in varying ways, which are also intended to be within the scope of the disclosure.

Example System Model

One example of a downlink NOMA system can be illustrated assuming that one eNB serves two UEs using the same frequency and time resource (for simplicity of illustration, only two UEs are considered; other UEs can be paired and simultaneously served in a similar manner). The eNB is mounted with $N_t$ transmit antennas (e.g., one or two in the example provided, although in various embodiments, more can be employed) and each UE is mounted with $N_r$ receive antennas. The modulated symbols of both UEs are summed up after power scaling before transmitting. This is described using equation (1):

$$y_i = H_i(\sqrt{p_1}\ \underbrace{[P_1, P_2]/\sqrt{2}}_{P}\ \underbrace{\begin{bmatrix} x_{1,1} \\ x_{1,2} \end{bmatrix}}_{x_1} + \sqrt{p_2}\ P_1 x_2) + n_i \qquad (1)$$

where $y_i$ is the $N_r \times 1$ received signal vector of user i; $H_i$ is the $N_r \times N_t$ channel matrix of UE i; $p_i$ is the transmit power scaling factor for user i; $[P_1, P_2]/\sqrt{2}$ is the precoder matrix for UE1 and it is reduced to $P_1$ if UE1 has rank one transmission; $P_1$ is the precoder matrix for UE2; $x_i$ is the data symbol(s) of the codeword(s) intended for UE i; x is the super-imposed data symbol(s) of both UEs; $n_i$ is the $N_r \times 1$ noise vector; $N_r$ is the number of receive antennas; and $N_t$ is the number of transmit antennas.

The transmit power allocation is subject to the constraint in equation (2):

$$p_1 + p_2 = 1 \qquad (2)$$

And if it is assumed that $|(H_1P_1)^H(H_1P_1)|/r > |(H_2P_1)^H(H_2P_1)|$, where r is the transmission rank of UE1, then $p_1 < p_2$.

At the receiver side, each UE can first estimate the super-imposed data symbol using a linear receiver, e.g., a maximal ratio combining (MRC) receiver using equation (3):

$$\hat{x} = G_i y_i = \hat{H}_i^H y_i / \|\hat{H}_i\| \qquad (3)$$

After estimating the super-imposed data symbol, both UEs can decode the codeword of UE2 first. If the codeword of UE2 is decoded successfully, UE2 does not need to perform any further decoding. UE1 can reconstruct the second data symbol $\hat{x}_2 = \hat{H}_i x_2$ and subtract it from the super-imposed data symbol $\hat{x}$ to estimate the data symbol $x_1$ which is intended for UE1. The estimated data symbol of the codeword related to symbol $x_1$ can be written as equation (4):

$$\hat{x}_1 = (\hat{x} - \sigma\sqrt{p_2}\hat{x}_2)/\sqrt{p_1}, \qquad (4)$$

where σ is the interference cancellation factor and σ∈[0,1]. When σ equals to 1, the code word of UE2 is canceled completely.

Power Allocation

UEs with a large SINR difference can be paired together to maximize the NOMA gain, with the power control algorithm setting high transmit power for the UE with low channel gain, and vice versa. NOMA gain can be quantified via theoretical analysis. One possible way of obtaining $p_1^*$ (i.e., the power level for UE1) is to solve equation (5):

$$\frac{1}{2}\log_2(1 + \gamma_2) = \log_2\left(1 + \frac{(1 - p_1^*)\gamma_2}{(p_1^*/r)\gamma_2 + 1}\right), \qquad (5)$$

where $\gamma_2$ is the signal-to-noise ratio (SNR) of UE2.

When equation (5) is satisfied, the channel capacity of UE2 equals that of OMA transmission in which UE2 is allocated half of the system bandwidth and served with full transmit power. Therefore, the solution $p_1^*$ to equation (5) simplifies the capacity comparison between NOMA and OMA. The channel capacity gain of NOMA over OMA is then dependent on the channel capacity of UE1. This can be written using equation (6):

$$C_{NOMA} - C_{OMA} = \log_2(1 + p_1^*\gamma_1) - \frac{1}{2}\log_2(1 + \gamma_1), \qquad (6)$$

where $\gamma_1$ is the SNR of UE1, $C_{NOMA}$ is the channel capacity of NOMA, and $C_{OMA}$ is the channel capacity of OMA. The power allocation strategy that satisfies equation (5) assuming r=1 is given by $$p_1^* = \frac{\sqrt{1 + \gamma_2} - 1}{\gamma_2}, \text{ where } \gamma_2 > 0. \qquad (7)$$

Figure 5:
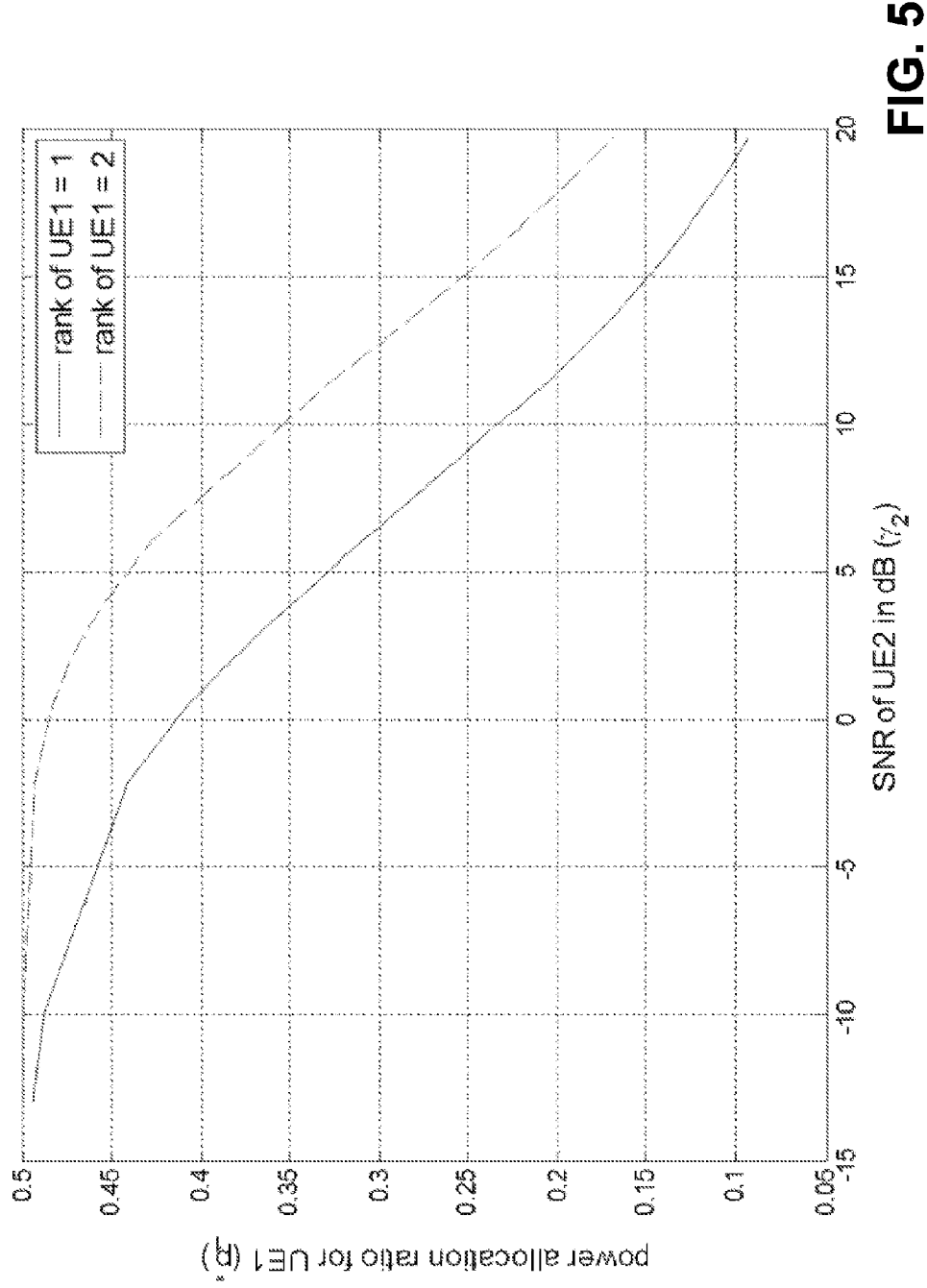
FIG. 5 is a graph of the power allocation ratio for UE1 as a function of the SNR of UE2 for UE1 transmission ranks of 1 and 2 according to various aspects described herein.

FIG. 5 illustrates a graph of the power allocation ratio for UE1 as a function of the SNR of UE2 for UE1 transmission ranks of 1 and 2 according to various aspects described herein.

According to equation (6), the channel capacity gain of NOMA over OMA is achieved if the power allocation ratio of UE1 satisfies equation (8):

$$p_1^* > \frac{\sqrt{1 + \gamma_1} - 1}{\gamma_1}, \text{ where } \gamma_1 > 0. \qquad (8)$$

From the assumption that $\gamma_1 > \gamma_2$, $p_1^*$ satisfies equation (8), as shown in FIG. 5.

Scheduling

Similar to multi-user multiple input multiple output (MU-MIMO), dynamically switching between OMA and NOMA avoids the reduction of overall system capacity. The dynamic switching between OMA and NOMA can be based on performance metrics, such as by comparing data throughput assuming OMA with data throughput assuming NOMA is selected. Although metrics can be employed to compare metrics based on all UEs communicating with an eNB, in aspects, to reduce processing time, metrics can be based on only a subset of the UEs, such as the n (e.g., 1, 2, etc.) UEs with the best or worst performance in OMA or NOMA. Metrics employed can be a function of instantaneous channel condition or data rate and/or average throughput. In one specific example, both the OMA and NOMA metrics can be based on the proportional fairness (PF) metrics. When the NOMA hypothesis is tested, the sum of PF metrics in a NOMA pair of UEs is used as the PF metric for the NOMA pair. If the PF metric of the best NOMA pair is higher than the PF metric of the best single UE transmission, NOMA transmission is employed. Otherwise, single UE (OMA) transmission is employed.

Receiver Type and Scheduling Implications

Different interference cancellation components can be employed in receivers for NOMA decoding at a UE. For different types of interference cancellation (IC), the details of the signaling employed may be different, and the scheduling may also be affected.

For codeword level IC, if a NOMA pair is scheduled to the same resources (i.e., the same set of physical resource blocks (PRBs)), layer one signaling to describe the PDSCH attributes of the interferer signal can be reduced when transmitting PDSCH to UE1. However, additional signaling to UE1 can be included to describe the PDSCH attributes of the interferer signal in aspects where UE1 employs codeword level IC and is not scheduled to the same resources as UE2.

For symbol level IC, the same modulation order and power ratio are used for two UEs when sending data signals to UEs via the Physical Downlink Shared Channel (PDSCH), but different UEs can be paired in different PRBs.

Signaling for UE2 for NOMA Decoding

For UE2, the control signaling can include the power scaling factor $p_2$ if the modulation order is higher than that of QPSK, if UE2 employs a MIMO receiver such as a minimum mean standard error (MMSE) type receiver. Additionally, the control signaling can include the power scaling factor $p_2$ for all modulations if UE2 employs a MIMO receiver such as a MMSE-IRC (interference rejection combining) type receiver, which requires channel amplitude information. FIG. 6 illustrates a table of example control signaling for UE2 with different types of MIMO receivers (minimum mean standard error (MMSE) and maximum likelihood (ML)) for various modulation orders (quadrature phase shift keying (QPSK) and different orders of quadrature amplitude modulation (QAM)) according to various aspects described herein. UE2 can treat the super-imposed signal from UE1 as additional interference, thus UE2's decoding can be assisted with minimal additional signaling.

For cell-specific reference symbol (CRS) based transmission modes, until release 12 of the LTE specification (LTE Rel-12) the PDSCH to CRS energy per resource element (EPRE) ratio is configured by the UE specific radio resource control (RRC) parameter $P_A$ and the cell specific RRC parameter $P_B$. Currently, eight values are defined for $P_A$ as follows (from the Third Generation Partnership Project (3GPP) technical specification 36.331 vb.0.0):

| PDSCH-ConfigDedicated::= | SEQUENCE { |
| p-a | ENUMERATED { |
| | dB-6, dB-4dot77, dB-3, dB-1dot77, |
| | dB0, dB1, dB2, dB3} |
| } | |

Since $p_2 \in (0.5, 1)$, if p-a were used to indicate $p_2$, it could only equal −1.77 dB (0.6653), which is likely to be insufficient. Thus, additional RRC signaling can be used to indicate $p_2$ as a separate UE-specific parameter.

Several options exist for $p_2$ indication. In a first example, several enumerated $p_2$ values can be defined (e.g., in the RRC specification) and one of those values can be selected semi-statically. For example:

| p-two | ENUMERATED {dB-2dot5, dB-2, dB-1dot5, dB-1} | and one bit can be introduced in downlink control information (DCI) to switch between NOMA transmission and OMA transmission.

In a second example, several values for $p_2$ can be defined and which value to use can be indicated in DCI. For example, 2 bits can be introduced in the DCI to select one out of four values for $p_2$ including 0 dB. When 0 dB is indicated, it indicates OMA transmission.

If UE-specific reference symbol (UERS)-based transmission mode 7, 8, 9, or 10 of the defined LTE transmission modes is configured for UE2, $p_2$ can also be indicated as in the above examples.

When $p_2$ is configured for UE2, the PDSCH to RS EPRE ratio is changed by adding $p_2$ (dB) to the existing PDSCH to RS EPRE ratio. Thus, UE2 can assume that there exists one super-imposed PDSCH and its PDSCH to RS EPRE ratio is changed by adding $$10\log_{10}\left(1 - 10^{\frac{p_2}{10}}\right)$$

(dB) to the existing PDSCH to RS EPRE ratio.

When NOMA transmission is indicated, in various aspects, UE2's transmission can have reduced flexibility, since UE2 has relatively worse channel gain and the eNB cannot serve it with full transmission power. Example limitations that can be applied include reduced modulation and coding scheme (MCS), for example, only supporting QPSK and 16QAM; and/or only supporting rank one transmission.

The reduced transmission flexibility may cause some redundancy in the DCI signaling, and that signaling can be either considered as a virtual cyclic redundancy check (CRC) state to increase the reliability of DCI or can be used to indicate partial modulation information of UE1. For example if MCS restriction is applied to UE2, UE2 may only need four bits to indicate MCS 0-15. In such an example, the most significant bit can be used to indicate the MCS of UE1, e.g., whether it is 16QAM or 64QAM. If only rank one is allowed for NOMA transmission for UE2, then the MCS/RV (redundancy version)/NDI (new data indicator) of the other transport block can be used to describe more detailed information of UE1's transmission MCS and rank if UE2's transmission-mode-dependent DCI is DCI 2x, which supports two codeword indication.

Signaling for UE1 for NOMA Decoding for Codeword Level IC

For UE1, besides the power scaling factor $p_1$ which is needed when the modulation order of code word 1 is higher than that of QPSK, other signaling is also needed in order to describe code word 2 and the cell-radio network temporary identity (C-RNTI) of UE2.

NOMA can be applied to existing transmission schemes defined in the LTE specification, including spatial multiplexing and transmit diversity.

When NOMA is applied to transmit diversity, e.g. transmission mode (TM) 2 or rank one of TM3, the super-imposed signal can be sent using transmit diversity over a pair of two consecutive subcarriers.

When NOMA is applied to spatial multiplexing, for example, TM4 or TM8, 9, or 10, the super-imposed signal can be sent using one beam (one transmit precoding matrix indicator (PMI) in TM4, or one UERS port in TM8, 9, or 10).

In LTE since Rel-8, if UE1 is configured with transmission mode 1/2/7, DCI format 1 is used to indicate single transport block transmission. In order to support a UE1 with a codeword IC receiver in NOMA transmission, the simplest way is to use DCI 2× for UE1, which can indicate two transport block transmission. For example, if DCI 2A is used for a UE configured with TM 1 or 2 and NOMA decoding, the MCS/NDI/RV for transport block (TB) 1 can be always for UE1's own TB, and the MCS/NDI/RV for transport block 2 can be always for UE2's TB. In such a situation, number of bits for precoding information in DCI 2A is not needed, even if the UE is configured with TM2 and the eNB is configured with 4 CRS ports.

If UE1 is configured with TM 3 and NOMA transmission, 1 bit of NOMA precoding information can be introduced to DCI 2A if the eNB is configured with 2 CRS ports, as shown in FIG. 7A, showing a table indicating example numbers of bits for NOMA information for UE1 according to various aspects described herein, and in FIG. 7B, showing a table indicating example content of the NOMA information field for UE1 when the eNB is configured with 2 antenna ports according to various aspects described herein. Additionally, the bit field pattern "3" in the precoding information field for 4 CRS ports can be reused to indicate NOMA transmission, as shown in FIG. 8 (showing example signaling of precoding information content for four antenna ports according to various aspects described herein), as a modification of 3GPP technical specification 36.213 vb20 at 5.3.3.1.5A-2, with additional or changed definitions indicated within the dashed area.

If UE1 is configured with TM4 and NOMA transmission, some of the reserved bit field patterns in the precoding information field of DCI 2 can be used to describe the NOMA transmission if the eNB is configured with 2 antenna ports as shown in FIG. 9 (showing example signaling of precoding information content for two antenna ports according to various aspects described herein), as a modification of 3GPP technical specification 36.213 vb20 at 5.3.3.1.5-4, with additional or changed definitions indicated within the dashed area, where PMI is the precoding matrix indicator, and PUSCH is the physical uplink shared channel. If the eNB is configured with 4 antenna ports, similar definitions can be used, as shown in FIG. 10A and FIG. 10B (showing a table indicating example signaling of precoding information content for four antenna ports according to various aspects described herein), as a modification of 3GPP technical specification 36.213 vb20 at 5.3.3.1.5-5, with additional or changed definitions indicated within the dashed area, where TPMI is the transmitted PMI.

The above definitions for TM4 with NOMA transmission can be extended to define TM6 with NOMA transmission, since TM6 is single layer closed loop MIMO (a special case of TM4) and with NOMA transmission, DCI 1B is not used for TM4 and DCI 2X is used for TM6 with NOMA transmission. The behavior will be quite similar to that of TM4 with NOMA transmission. Similarly, aspects discussed herein can readily be extended to TM5 (MU-MIMO) with NOMA.

If UE is configured with TM8, 9, or 10, UE-specific RS is used for PDSCH demodulation. TMS 8, 9, and 10 are usually used to support beamforming with large number of antennas. Thus, the motivation to extend UE-specific RS based TMs with NOMA function is less than that of CRS based TMs. However, TM8, 9, and 10 can be extended with NOMA functionalities by introducing a 1 bit NOMA function bit.

If the NOMA function bit is "0" and both transport blocks are enabled, the number of layers equals two; transport block 1 is mapped to codeword 0; and transport block 2 is mapped to codeword 1. Antenna ports 7 and 8 are used for spatial multiplexing.

If NOMA function bit is "1" and both transport blocks are enabled, the number of transmission layers intended for one user equals to one; transport block 1 is mapped to codeword 0; and UE2's transport block is described using the MCS/NDI/RV of transport block 2. Antenna port 7 is used for demodulation. The PDSCH to UE-specific RS EPRE ratio is $p_1$ for transport block 1 and $1-p_1$ for UE2's transport block.

With NOMA extension of TMs 8, 9, and 10, spatial multiplexing of up to 4 NOMA pairs can be supported, with each NOMA pair consisting of two NOMA users (e.g., a UE1 and a UE2).

Signaling for UE2's C-RNTI for UE1 NOMA Decoding for UE1 Employing Codeword Level IC If UE1 use code word level IC for NOMA decoding, UE1 is sent signaling associated with UE2's C-RNTI in order to check whether the decoding of code word 2 is correct or not. Since NOMA pairing decisions need not be fixed and can be changed by the scheduler dynamically with time, including the full 16 bit C-RNTI of UE2 in the DCI sent to UE1 may not be ideal. Instead, one of several alternative approaches may be employed.

In a first alternative approach, RRC can be used to configure UE1 with multiple potential C-RNTIs to pair with as UE2 (e.g., 3-4), then UE1 tests any of the possible C-RNTI for UE2 when decoding code word 2. If a CRC can pass after de-scrambling using any of the C-RNTI for UE2 configured via RRC, then UE1 can deduce that code word 2 is decoded successfully.

In a second alternative approach, RRC can be used to configure UE1 with multiple potential C-RNTI to pair with as UE2 (e.g., 3-4) and sufficient bits (e.g., 2 for 3 or 4 potential C-RNTI) can be added to the DCI to indicate which pairing C-RNTI is actually used as UE2's C-RNTI. UE1 can then de-scramble using the indicated C-RNTI in the DCI to check whether a CRC of codeword 2 can pass.

In a third alternative approach, dedicated RRC signaling can be used to configure UE1 with a set of potential NOMA pairing C-RNTIs (e.g., 16, 32, etc. C-RNTIs). The set size is large enough to avoid performance degradation due to required scheduling restriction and/or to avoid the need of frequent RRC signaling to update the set. New bits (e.g., 4 or 5 bits, or whatever number is appropriate given the number of configured C-RNTIs) can be defined in the DCI to indicate which C-RNTI of the configured set of potential C-RNTIs corresponds to UE2.

In a fourth alternative approach, a new RNTI, called NOMA-RNTI is defined. When NOMA is applied, the PDSCH of UE2 is scrambled using the NOMA-RNTI so that UE1 can know the scrambling codes of the PDSCH of UE2. When NOMA is not applied, the PDSCH of UE2 is scrambled using the original C-RNTI of UE2. In a variation of this approach, multiple new NOMA-RNTIs (e.g., up to 4, 8, etc.) can be defined, where the new NOMA-RNTIs are used to scramble the PDSCH of UE2. When NOMA is applied, eNB chooses one of the new NOMA-RNTIs and explicitly signals it (in DCIs) to both of UE1 and UE2.

In a fifth alternative approach, a cell-specific set of NOMA-RNTIs (e.g., 4, 8, etc.) is signaled as part of system information. By coordination among neighbor cells, neighbor cells can use different sets of NOMA-RNTIs. This can achieve inter-cell interference randomization with a small number of NOMA-RNTIs per cell. Both UE1 and UE2 are informed of which NOMA-RNTI from the set is used dynamically, via an appropriate number (e.g., 2, 3, etc.) of indication bits in the DCI.

Signaling for UE1 NOMA Decoding for UE1 Employing Symbol Level IC

Unlike codeword level IC, a UE1 employing symbol level IC does not need to know the MCS/NDI/RV of code word 2 in order to cancel its contribution to the super-imposed received signal. For a UE1 employing symbol level IC, the 8 bits MCS/NDI/RV of code word 2 can be reduced to 2 bits to describe the modulation of the super-imposed code word 2 as, shown in FIG. 11, illustrating a table of example signaling of the modulation order of code word 2 for UE1 according to various aspects described herein.

Channel State Information (CSI) Feedback Enhancement

Optimal power allocation and user pairing in NOMA can be provided if the eNB has knowledge of the effective channel power of each UE normalized by noise plus inter-cell interference power. This information can be implicitly delivered to the eNB by conventional channel quality indicator (CQI) calculation and feedback. The conventional CQI, which does not take into account the NOMA co-channel interference, but is obtained through channel and inter-cell interference plus noise measurements, can be de-mapped to the effective SNR for each UE and be used for multi-user scheduling and power allocation.

Secondly, the signal-to-interference and noise ratio (SINR) of each UE can be considered for actual MCS selection. In one NOMA pair, UE2 receives interference from UE1. The impact of the interference from UE1 to UE2 on UE2's achievable throughput may not be significant, as the interference power is likely to be much smaller than the desired signal power via optimal power allocation. However, the interference from UE2 to UE1 is dependent on how good the interference can be cancelled by UE1. The CQI mismatch due to residual interference after interference cancellation may not be fully compensated by the eNB easily using techniques such as an outer loop link adaptation algorithm. Since outer loop usually takes time to converge, unless UE1 compensates the interference from UE2 in the reported CQI, the short term link adaptation outage cannot be avoided. This can be harmful for small packets when outer loop has not converged yet.

In order to take into account the residual interference from UE2 to UE1 in the link adaptation, UE1 can additionally report CQI assuming NOMA transmission and interference cancellation. With the given hypothetical modulation order of UE2 and power allocation ratio, the residual interference can be estimated, and CQI can calculated based on effective SINR after interference cancellation.

Aspects described herein can provide for modifications of current wireless technologies and/or standards to incorporate NOMA transmission. For example, LTE-A specifications and standards can be modified to incorporate aspects described herein. For the NOMA CQI, the CQI definition can be changed such that it reads as below, as an example modification of the 3GPP technical specification 36.213 vb30 at section 7.2.3, through table 7.2.3-1:

In the CSI reference resource, the UE shall assume the following for the purpose of deriving the CQI index, and if also configured, PMI and RI:

The first 3 OFDM symbols are occupied by control signalling

No resource elements used by primary or secondary synchronisation signals or PBCH or EPDCCH CP length of the non-MBSFN subframes Redundancy Version 0

If CSI-RS is used for channel measurements, the ratio of PDSCH EPRE to CSI-RS EPRE is as given in Section 7.2.5

For transmission mode 9 CSI reporting:
CRS REs are as in non-MBSFN subframes;
If the UE is configured for PMI/RI reporting, the UE-specific reference signal overhead is consistent with the most recent reported rank if more than one CSI-RS port is configured, and is consistent with rank 1 transmission if only one CSI-RS port is configured; and PDSCH signals on antenna ports {7 ... 6+v} for v layers would result in signals equivalent to corresponding symbols transmitted on antenna ports {15 ... 14+P}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i)=[x^{(0)}(i) \ldots x^{(v-1)}(i)]^T$ is a vector of symbols from the layer mapping in section 6.3.3.2 of [3], P∈{1,2,4,8} is the number of CSI-RS ports configured, and if only one CSI-RS port is configured, W(i) is 1, otherwise W(i) is the precoding matrix corresponding to the reported PMI applicable to x(i). The corresponding PDSCH signals transmitted on antenna ports {15 ... 14+P} would have a ratio of EPRE to CSI-RS EPRE equal to the ratio given in section 7.2.5.

For transmission mode 10 CSI reporting, if a CSI process is configured without PMI/RI reporting:
If the number of antenna ports of the associated CSI-RS resource is one, a PDSCH transmission is on single-antenna port, port 7. The channel on antenna port {7} is inferred from the channel on antenna port {15} of the associated CSI-RS resource.
CRS REs are as in non-MBSFN subframes. The CRS overhead is assumed to be the same as the CRS overhead corresponding to the number of CRS antenna ports of the serving cell;
The UE-specific reference signal overhead is 12 REs per PRB pair.

Otherwise,
If the number of antenna ports of the associated CSI-RS resource is 2, the PDSCH transmission scheme assumes the transmit diversity scheme defined in section 7.1.2 on antenna ports {0,1} except that the channels on antenna ports {0,1} are inferred from the channels on antenna port {15, 16} of the associated CSI resource respectively.
If the number of antenna ports of the associated CSI-RS resource is 4, the PDSCH transmission scheme assumes the transmit diversity scheme defined in section 7.1.2 on antenna ports {0,1,2,3} except that the channels on antenna ports {0,1,2, 3} are inferred from the channels on antenna ports {15, 16, 17, 18} of the associated CSI-RS resource respectively.

The UE is not expected to be configured with more than 4 antenna ports for the CSI-RS resource associated with the CSI process configured without PMI/RI reporting.

The overhead of CRS REs is assuming the same number of antenna ports as that of the associated CSI-RS resource.

UE-specific reference signal overhead is zero.

For transmission mode 10 CSI reporting, if a CSI process is configured with PMI/RI reporting:

CRS REs are as in non-MBSFN subframes. The CRS overhead is assumed to be the same as the CRS overhead corresponding to the number of CRS antenna ports of the serving cell;

The UE-specific reference signal overhead is consistent with the most recent reported rank for the CSI process if more than one CSI-RS port is configured, and is consistent with rank 1 transmission if only one CSI-RS port is configured; and PDSCH signals on antenna ports $\{7 \ldots 6+v\}$ for v layers would result in signals equivalent to corresponding symbols transmitted on antenna ports $\{15 \ldots 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i)=[x^{(0)}(i) \ldots x^{(v-1)}(i)]^T$ is a vector of symbols from the layer mapping in section 6.3.3.2 of [3], $P \in \{1,2,4,8\}$ is the number of antenna ports of the associated CSI-RS resource, and if P=1, W(i) is 1, otherwise W(i) is the precoding matrix corresponding to the reported PMI applicable to x(i). The corresponding PDSCH signals transmitted on antenna ports $\{15 \ldots 14+P\}$ would have a ratio of EPRE to CSI-RS EPRE equal to the ratio given in section 7.2.5

Assume no REs allocated for CSI-RS and zero-power CSI-RS

Assume no REs allocated for PRS

The PDSCH transmission scheme given by Table 7.2.3-0 depending on the transmission mode currently configured for the UE (which may be the default mode).

If CRS is used for channel measurements, the ratio of PDSCH EPRE to cell-specific RS EPRE is as given in Section 5.2 with the exception of $\rho_A$ which shall be assumed to be $\rho_A = P_A + \Delta_{offset} + 10 \log_{10}(2)$ [dB] for any modulation scheme, if the UE is configured with transmission mode 2 with 4 cell-specific antenna ports, or transmission mode 3 with 4 cell-specific antenna ports and the associated RI is equal to one;

$\rho_A = P_A + \Delta_{offset}$ [dB] for any modulation scheme and any number of layers, otherwise.

The shift $\Delta_{offset}$ is given by the parameter nomPDSCH-RS-EPRE-Offset which is configured by higher-layer signalling.

If the reported CQI assumes that the PDSCH transmission contains two super-imposed data symbols, UE shall assume the following for deriving the CQI index:

The ratio of PDSCH EPRE to RS EPRE applies to the super imposed PDSCH symbol.

The ratio of signal PDSCH EPRE to super-imposed PDSCH EPRE is a (0.375).

The ratio of interfering PDSCH EPRE to super-imposed PDSCH EPRE is 1−α (0.625).

The interfering PDSCH is QPSK.

TABLE 7.2.3-0

PDSCH transmission scheme assumed for CSI reference resource

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity<br>If the UE is configured with PMI/RI reporting: if the number of CSI-RS ports is one, single-antenna port, port 7; otherwise up to 8 layer transmission, ports 7-14 (see subclause 7.1.5B) |
| 10 | If a CSI process of the UE is configured without PMI/RI reporting: if the number of CSI-RS ports is one, single-antenna port, port7; otherwise transmit diversity<br>If a CSI process of the UE is configured with PMI/RI reporting: if the number of CSI-RS ports is one, single-antenna port, port 7; otherwise up to 8 layer transmission, ports 7-14 (see subclause 7.1.5B) |

TABLE 7.2.3-1

4-bit CQI Table

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Additionally, although a specific value of a (=0.375) is included above for purposes of illustration, other values of $\alpha \in (0, 0.5)$ can be employed in various embodiments.

A UE may not need to report the NOMA CQI for all subbands. One way to report in a bandwidth-efficient manner is simply to report a delta CQI for the whole system bandwidth. The delta CQI can be encoded using 2 bits instead of 4 bits, such as shown in the example table of FIG. 12, illustrating a table of example encoding of differential NOMA channel quality indicator information according to various aspects described herein.

Figure 13:
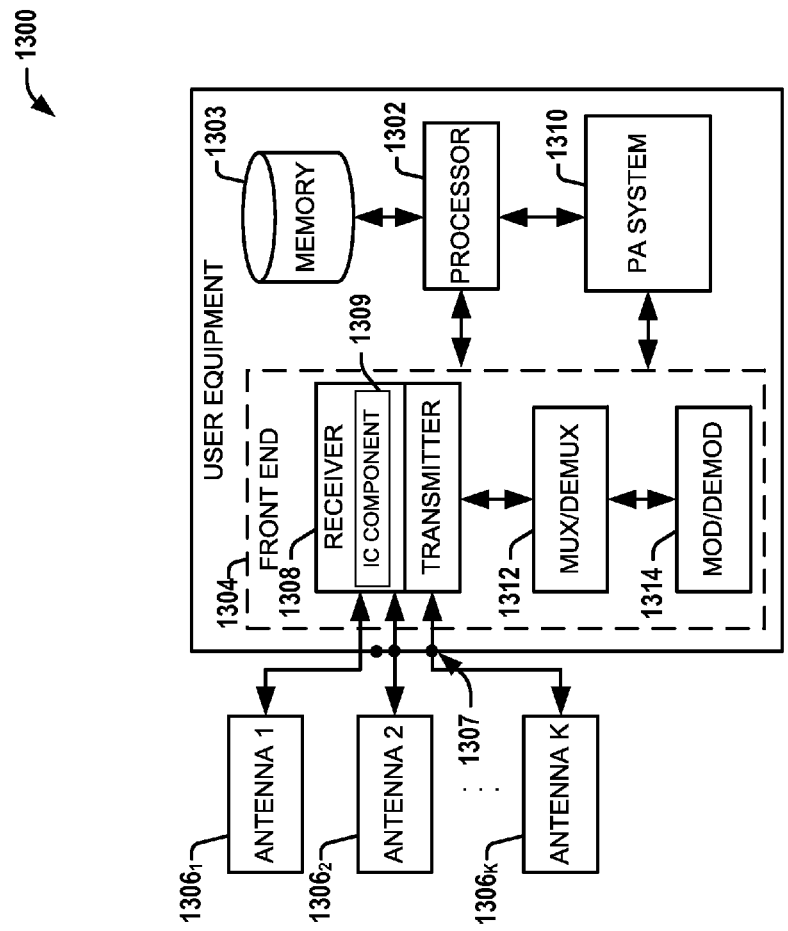
FIG. 13 is a block diagram illustrating an example user equipment useable in connection with various aspects described herein.

Referring to FIG. 13, illustrated is an exemplary user equipment or mobile communication device 1300 that can be utilized with one or more aspects of the systems, methods, or devices facilitating NOMA communication described herein according to various aspects. The user equipment 1300, for example, comprises a digital baseband processor 1302 that can be coupled to a data store or memory 1303, a front end 1304 (e.g., an RF front end, an acoustic front end, or the other like front end) and a plurality of antenna ports 1307 for connecting to a plurality of antennas $1306_1$ to $1306_k$ (k being a positive integer). The antennas $1306_1$ to $1306_k$ can receive and transmit signals to and from one or more wireless devices such as access points, access terminals, wireless ports, routers and so forth, which can operate within a radio access network or other communication network generated via a network device. The user equipment 1300 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 1304 can include a communication platform, which comprises electronic components and associated circuitry that provide for processing, manipulation or shaping of the received or transmitted signals via one or more receivers or transmitters 1308, with at least one receiver comprising an interference cancellation component 1309, a mux/demux component 1312, and a mod/demod component 1314. The front end 1304, for example, is coupled to the digital baseband processor 1302 and the set of antenna ports 1307, in which the set of antennas $1306_1$ to $1306_k$ can be part of the front end. At least one receiver 1308 can comprise an interference cancellation (IC) component 1309 and be configured to receive and decode non-orthogonal multiple access (NOMA) communications.

When receiving NOMA communications wherein the data signal (e.g., via PDSCH) of user equipment 1300 is power multiplexed with the data signal of a paired user equipment, user equipment 1300 can receive a control signal that indicates whether it is a first user equipment (UE1) with a higher channel gain (in which case its data signal will have a lower received power than that of the paired user equipment), or a second user equipment (UE2) with a lower channel gain (in which case its data signal will have a higher received power than that of the paired user equipment). In both cases, receiver 1308 can decode the data signal with the higher received power. In response to the control signal indicating that the user equipment 1300 is the second user equipment, receiver 1308 can determine the decoded higher power data signal to be a received data signal for user equipment 1300. In response to the control signal indicating that the user equipment 1300 is the second user equipment, interference cancellation component 1309 can reconstruct the higher power data signal and subtract it from the total received data signal to obtain the lower power data signal. Receiver 1308 can decode the lower power data signal and determine the decoded lower power data signal to be the received data signal for user equipment 1300.

The user equipment 1300 can also include a processor 1302 or a controller that can operate to provide or control one or more components of the user equipment 1300. For example, the processor 1302 can confer functionality, at least in part, to substantially any electronic component within the user equipment 1300, in accordance with aspects of the disclosure. As an example, the processor can be configured to execute, at least in part, executable instructions that control determination of whether a communication is a NOMA communication, and decoding and interference cancellation of NOMA communications via receiver 1308 and interference cancellation component 1309.

The processor 1302 can operate to enable the user equipment 1300 to process data (e.g., symbols, bits, or chips) for multiplexing/demultiplexing with the mux/demux component 1312, or modulation/demodulation via the mod/demod component 1314, such as implementing direct and inverse fast Fourier transforms, selection of modulation rates, selection of data packet formats, inter-packet times, etc. Memory 1303 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 1302 is functionally and/or communicatively coupled (e.g., through a memory bus) to memory 1303 in order to store or retrieve information necessary to operate and confer functionality, at least in part, to communication platform or front end 1304 including the receiver 1308 and interference cancellation component 1309, and the PA system 910. While the components in FIG. 13 are illustrated in the context of a user equipment, such illustration is not limited to user equipment but also extends to other wireless communication devices, such as base station (e.g., eNodeB), small cell, femtocell, macro cell, microcell, etc.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an Evolved NodeB (eNB), comprising a memory, a processor, and a transmitter circuit. The memory stores executable instructions. The processor is configured to execute the executable instructions to at least: evaluate an orthogonal multiple access (OMA) metric and a non-orthogonal multiple access (NOMA) metric of a plurality of user equipments (UEs) comprising a first UE and a second UE having a lower channel gain than the first UE; generate, based on the OMA metric and the NOMA metric, a protocol instruction that indicates an OMA transmission or a NOMA transmission; and determine a first modulation and coding scheme (MCS) for the first UE and a second MCS for the second UE. The transmitter circuit is configured to receive the protocol instruction and to transmit, in response thereto, a first data signal and a first downlink control information (DCI) message associated with the first UE, and a second data signal and a second DCI message associated with the second UE. In response to the protocol instruction indicating the NOMA transmission, the first data signal and the second data signal are power multiplexed, the first DCI message and the second DCI message indicate the first data signal and the second data signal are transmitted via NOMA, and the first DCI message indicates the second MCS.

Example 2 includes the subject matter of example 1, wherein the transmitter circuit is configured to transmit to the plurality of UEs, wherein the processor is further configured to execute the executable instructions to determine an individual OMA metric for each of the plurality of UEs and a pairwise NOMA metric for each of one or more pairs of UEs of the plurality of UEs, wherein the OMA metric is a best individual OMA metric of the individual OMA metrics, and wherein the NOMA metric is a best pairwise NOMA metric of the pairwise NOMA metrics.

Example 3 includes the subject matter of any of examples 1-2, including or omitting optional features, wherein, in response to a determination that the second MCS includes amplitude-shift keying or amplitude modulation, a power scaling factor of the second data signal is indicated via at least one of the second DCI message or a radio resource control (RRC) signal that the transmitter circuit is configured to transmit.

Example 4 includes the subject matter of any of examples 1-3, including or omitting optional features, wherein the processor is further configured to execute the executable instructions to determine a receiver type of the second UE, wherein, in response to a determination that the receiver type of the second UE is configured to employ channel amplitude information, the second DCI message indicates a modulation order of the first data signal, and a power scaling factor of the second data signal is indicated via at least one of the second DCI message or a radio resource control (RRC) signal that the transmitter circuit is configured to transmit.

Example 5 includes the subject matter of any of examples 1-4, including or omitting optional features, wherein the processor is further configured to execute the executable instructions to determine an interference cancellation level of the first UE.

Example 6 includes the subject matter of any of examples 5, including or omitting optional features, wherein, in response to a determination that the interference cancellation level is symbol level, the first data signal and the second data signal are scheduled to a distinct set of physical resource blocks (PRBs).

Example 7 includes the subject matter of any of examples 5, including or omitting optional features, wherein, in response to a determination that the interference cancellation level is codeword level, the first data signal and the second data signal are scheduled to a common set of physical resource blocks (PRBs).

Example 8 includes the subject matter of any of examples 1-7, including or omitting optional features, wherein the first DCI message indicates a power scaling factor of the first data signal in response to a determination that the MCS of the first data signal includes amplitude-shift keying or amplitude modulation.

Example 9 includes the subject matter of example 1, wherein, in response to a determination that the second MCS includes amplitude-shift keying or amplitude modulation, a power scaling factor of the second data signal is indicated via at least one of the second DCI message or a radio resource control (RRC) signal that the transmitter circuit is configured to transmit.

Example 10 includes the subject matter of example 1, wherein the processor is further configured to execute the executable instructions to determine a receiver type of the second UE, wherein, in response to a determination that the receiver type of the second UE is configured to employ channel amplitude information, the second DCI message indicates a modulation order of the first data signal, and a power scaling factor of the second data signal is indicated via at least one of the second DCI message or a radio resource control (RRC) signal that the transmitter circuit is configured to transmit.

Example 11 includes the subject matter of example 1, wherein the processor is further configured to execute the executable instructions to determine an interference cancellation level of the first UE.

Example 12 includes the subject matter of example 11, wherein, in response to a determination that the interference cancellation level is symbol level, the first data signal and the second data signal are scheduled to a distinct set of physical resource blocks (PRBs).

Example 13 includes the subject matter of example 11, wherein, in response to a determination that the interference cancellation level is codeword level, the first data signal and the second data signal are scheduled to a common set of physical resource blocks (PRBs).

Example 14 includes the subject matter of example 1, wherein the first DCI message indicates a power scaling factor of the first data signal in response to a determination that the MCS of the first data signal includes amplitude-shift keying or amplitude modulation.

Example 15 is a user equipment (UE), comprising an antenna port, a processor, and an interference cancellation component. The antenna port is configured to couple to at least one antenna, wherein the antenna port is configured to receive a physical downlink control channel (PDCCH) transmission comprising a downlink control information (DCI) message and to receive a physical downlink shared channel (PDSCH) transmission comprising a first data signal and a second data signal. The processor is operably coupled to the antenna port and configured to decode the second data signal to obtain a decoded second data signal and to determine, based on the DCI message, whether the PDSCH transmission is an orthogonal multiple access (OMA) transmission or a non-orthogonal multiple access NOMA transmission, wherein, in response to a determination that the PDSCH transmission is the NOMA transmission, the processor is configured to determine whether the DCI message indicates a first reception protocol or a second reception protocol distinct from the first reception protocol. The interference cancellation component is operably coupled to the antenna port and configured to employ interference cancellation according to at least one of a codeword level or a symbol level. In response to a determination that the DCI message indicates the first reception protocol, the interference cancellation component is configured to employ the interference cancellation to subtract the decoded second data signal from the PDSCH transmission to obtain the first data signal, and the processor is configured to decode the first data signal as a received data signal. In response to a determination that the DCI message indicates the second reception protocol, the processor is configured to designate the decoded second data signal as the received data signal.

Example 16 includes the subject matter of example 15, wherein the DCI message indicates a power scaling factor of the second data signal, and wherein the processor is configured to decode the second data signal based at least in part on the power scaling factor of the second data signal.

Example 17 includes the subject matter of any of examples 15-16, including or omitting optional features, wherein, in response to the determination that the DCI message indicates the first reception protocol, the processor is configured to determine, based on the DCI message, a modulation order of the second data signal.

Example 18 includes the subject matter of any of examples 15-17, including or omitting optional features, wherein the interference cancellation component is configured to employ interference cancellation according to the symbol level, and wherein the DCI message indicates a first modulation and coding scheme (MCS) of the first data signal and a second MCS of the second data signal.

Example 19 includes the subject matter of any of examples 15-17, including or omitting optional features, wherein the interference cancellation component is configured to employ interference cancellation according to the codeword level, and in response to the determination that the DCI message indicates the first reception protocol, the processor is configured to determine a radio network temporary identity (RNTI) associated with the second data signal, wherein the processor is configured to decode the second data signal based at least in part on the RNTI associated with the second data signal.

Example 20 includes the subject matter of any of examples 19, including or omitting optional features, wherein the antenna port is further configured to receive a radio resource control (RRC) signal comprising a plurality of cell-RNTIs (C-RNTIs), wherein the processor is configured to determine the RNTI associated with the second data signal from among the plurality of C-RNTIs.

Example 21 includes the subject matter of any of examples 20, including or omitting optional features, wherein the processor is configured to attempt to decode the second data signal according to one or more of the plurality of C-RNTIs in order to determine the RNTI associated with the second data signal.

Example 22 includes the subject matter of any of examples 20, including or omitting optional features, wherein the processor is configured to determine, based on the DCI message, the RNTI associated with the second data signal from among the plurality of C-RNTIs.

Example 23 includes the subject matter of any of examples 19, including or omitting optional features, wherein the processor is configured to determine, based on the DCI message, the RNTI associated with the second data signal from among a plurality of NOMA-specific RNTIs.

Example 24 includes the subject matter of any of examples 15-23, including or omitting optional features, wherein, in response to the determination that the DCI message indicates the first reception protocol, the processor is configured to determine a NOMA channel quality indicator (CQI) based on the NOMA transmission and subtraction of the decoded second data signal, wherein the antenna port is configured to transmit the NOMA CQI Example 25 includes the subject matter of example 15, wherein, in response to the determination that the DCI message indicates the first reception protocol, the processor is configured to determine, based on the DCI message, a modulation order of the second data signal.

Example 26 includes the subject matter of example 15, wherein the interference cancellation component is configured to employ interference cancellation according to the symbol level, and wherein the DCI message indicates a first modulation and coding scheme (MCS) of the first data signal and a second MCS of the second data signal.

Example 27 includes the subject matter of example 15, wherein the interference cancellation component is configured to employ interference cancellation according to the codeword level, and in response to the determination that the DCI message indicates the first reception protocol, the processor is configured to determine a radio network temporary identity (RNTI) associated with the second data signal, wherein the processor is configured to decode the second data signal based at least in part on the RNTI associated with the second data signal.

Example 28 includes the subject matter of example 27, wherein the antenna port is further configured to receive a radio resource control (RRC) signal comprising a plurality of cell-RNTIs (C-RNTIs), wherein the processor is configured to determine the RNTI associated with the second data signal from among the plurality of C-RNTIs.

Example 29 includes the subject matter of example 28, wherein the processor is configured to attempt to decode the second data signal according to one or more of the plurality of C-RNTIs in order to determine the RNTI associated with the second data signal.

Example 30 includes the subject matter of example 28, wherein the processor is configured to determine, based on the DCI message, the RNTI associated with the second data signal from among the plurality of C-RNTIs.

Example 31 includes the subject matter of example 27, wherein the processor is configured to determine, based on the DCI message, the RNTI associated with the second data signal from among a plurality of NOMA-specific RNTIs.

Example 32 includes the subject matter of example 15, wherein, in response to the determination that the DCI message indicates the first reception protocol, the processor is configured to determine a NOMA channel quality indicator (CQI) based on the NOMA transmission and subtraction of the decoded second data signal, wherein the antenna port is configured to transmit the NOMA CQI.

Example 33 is a non-transitory machine readable medium comprising instructions that, when executed, cause an Evolved NodeB (eNB) to: determine a projected first data throughput of an orthogonal multiple access (OMA) protocol and a projected second data throughput of a non-orthogonal multiple access (NOMA) protocol; select, based on a comparison between the projected first data throughput and the projected second data throughput, the OMA protocol or the NOMA protocol as a selected protocol; determine, in response to selecting the NOMA protocol, a first power allocation ratio for a first UE and a second power allocation ratio for a second UE with a lower signal-to-interference-plus-noise ratio (SINR) than the first UE, wherein the second power allocation ratio is greater than the first power allocation ratio; transmit, via a physical downlink shared channel (PDSCH), a first data signal associated with the first UE according to a first transmission mode and a second data signal associated with the second UE according to a second transmission mode, wherein, in response to selecting the NOMA protocol, the first data signal and the second data signal are transmitted as a super-imposed signal comprising the first data signal according to the first power allocation ratio and the second data signal according to the second power allocation ratio; and transmit, via a physical downlink control channel (PDCCH), a first DCI message associated with the first UE and a second DCI message associated with the second UE, wherein the first DCI message and the second DCI message indicate the selected protocol.

Example 34 includes the subject matter of example 33, wherein the first DCI message indicates a modulation and coding scheme (MCS) of the second data signal.

Example 35 includes the subject matter of any of examples 33-34, including or omitting optional features, wherein the second DCI message indicates a modulation and coding scheme (MCS) of the first data signal.

Example 36 includes the subject matter of example 33, wherein the second DCI message indicates a modulation and coding scheme (MCS) of the first data signal.

Example 37 includes the subject matter of example 33, wherein, in response to the first transmission mode comprising transmit diversity, the super-imposed signal is transmitted via transmit diversity over a pair of consecutive sub-carriers.

Example 38 includes the subject matter of example 33, wherein, in response to the first transmission mode comprising spatial multiplexing, the super-imposed signal is transmitted via a single beam.

Example 39 includes the subject matter of example 33, wherein the first DCI message indicates the first power allocation ratio.

Example 40 includes the subject matter of example 33, wherein the second DCI message indicates the second power allocation ratio.

Example 41 is a system that facilitates non-orthogonal multiple access (NOMA) communication, comprising a memory, a processor, and a transmitter circuit. The memory stores executable instructions. The processor is configured to execute the executable instructions to at least: evaluate an orthogonal multiple access (OMA) metric and a NOMA metric of a plurality of user equipments (UEs) comprising a first UE and a second UE having a lower channel gain than the first UE; and generate, based on the OMA metric and the NOMA metric, a protocol instruction that indicates an OMA transmission or a NOMA transmission. The transmitter circuit is configured to receive the protocol instruction and to transmit, in response thereto, a first data signal and a first control signal associated with the first UE, and a second data signal and a second control signal associated with the second UE. In response to the protocol instruction indicating the NOMA transmission, the first data signal and the second data signal are power multiplexed, and the first control signal and the second control signal indicate the first data signal and the second data signal are transmitted via NOMA.

Example 42 includes the subject matter of example 41, wherein the transmitter circuit is configured to transmit to the plurality of UEs, wherein the processor is further configured to execute the executable instructions to determine an individual OMA metric for each of the plurality of UEs and a pairwise NOMA metric for each of one or more pairs of UEs of the plurality of UEs, wherein the OMA metric is a best individual OMA metric of the individual OMA metrics, and wherein the NOMA metric is a best pairwise NOMA metric of the pairwise NOMA metrics.

Example 43 includes the subject matter of example 41, wherein the processor is further configured to execute the executable instructions to determine a modulation and coding scheme (MCS) of the second data signal, wherein the second control signal indicates a power scaling factor of the second data signal in response to a determination that the MCS of the second data signal includes amplitude-shift keying or amplitude modulation.

Example 44 includes the subject matter of example 41, wherein the processor is further configured to execute the executable instructions to determine a receiver type of the second UE, wherein the second control signal indicates a power scaling factor of the second data signal and a modulation order of the first data signal in response to a determination that the second UE comprises a maximum likelihood receiver type.

Example 45 includes the subject matter of example 41, wherein the processor is further configured to execute the executable instructions to determine an interference cancellation level employed by the first UE.

Example 46 includes the subject matter of example 45, wherein the interference cancellation level is symbol level, and wherein the first control signal indicates a modulation order of the second data signal.

Example 47 includes the subject matter of example 45, wherein the interference cancellation level is codeword level, and wherein the first data signal and the second data signal are scheduled to a common set of physical resource blocks.

Example 48 includes the subject matter of example 47, wherein the processor is further configured to execute the executable instructions to determine a modulation and coding scheme (MCS) of the first data signal, and wherein the first control signal indicates a power scaling factor of the first data signal in response to a determination that the MCS of the first data signal includes amplitude-shift keying or amplitude modulation.

Example 49 includes the subject matter of example 47, wherein the processor is further configured to execute the executable instructions to determine a modulation and coding scheme (MCS) of the second data signal, and wherein the first control signal indicates the MCS of the second data signal.

Example 50 includes the subject matter of example 47, wherein the processor is further configured to execute the executable instructions to determine an identifier of the second UE, and wherein the first control signal indicates the identifier of the second UE.

Example 51 includes the subject matter of example 50, wherein the first control signal indicates the identifier of the second UE via a pre-defined identifier of a plurality of pre-defined identifiers stored at the first UE.

Example 52 includes the subject matter of example 41, wherein the transmitter circuit is configured to employ at least one of transmit diversity or spatial multiplexing to transmit via NOMA.

Example 53 is a system that facilitates non-orthogonal multiple access (NOMA) communication, comprising: an antenna port, a processor and an interference cancellation component. The antenna port is configured to couple to at least one antenna, wherein the antenna port is configured to receive a control signal and a data transmission comprising a first data signal and a second data signal. The processor is configured to determine, based on the control signal, whether the data transmission is an OMA transmission or a NOMA transmission, wherein, in response to a determination that the data transmission is the NOMA transmission, the processor is configured to determine whether the control signal indicates a first reception protocol or a second reception protocol distinct from the first reception protocol and the processor is configured to decode the second data signal to obtain a decoded second data signal. In response to a determination that the control signal indicates the first reception protocol, the interference cancellation component is configured to subtract the decoded second data signal from the data transmission to obtain the first data signal, and the processor is configured to decode the first data signal as a received data signal. In response to a determination that the control signal indicates the second reception protocol, the processor designates the decoded second data signal as the received data signal.

Example 54 includes the subject matter of example 53, wherein the control signal indicates a power scaling factor of the second data signal, and wherein the processor is configured to decode the second data signal based at least in part on the power scaling factor of the second data signal.

Example 55 includes the subject matter of example 53, wherein, in response to the determination that the control signal indicates the first reception protocol, the processor is configured to determine, based on the control signal, a modulation order of the second data signal.

Example 56 includes the subject matter of example 53, wherein the interference cancellation component is configured to employ symbol level interference cancellation.

Example 57 includes the subject matter of example 53, wherein the interference cancellation component is configured to employ codeword level interference cancellation.

Example 58 includes the subject matter of example 57, wherein, in response to the determination that the control signal indicates the first reception protocol, the processor is configured to determine, based on the control signal, a device identifier associated with the second data signal.

Example 59 includes the subject matter of example 57, wherein the processor is configured to determine a device identifier associated with the second data signal via attempting to decode the second data signal according to a plurality of pre-defined device identifiers.

Example 60 includes the subject matter of example 53, wherein, in response to the determination that the control signal indicates the first reception protocol, the processor is configured to determine a NOMA channel quality indicator (CQI) based on the NOMA transmission and subtraction of the decoded second data signal, wherein the antenna port is configured to transmit the NOMA CQI.

Example 61 is a method of facilitating non-orthogonal multiple access (NOMA), comprising: evaluating an orthogonal multiple access (OMA) metric and a NOMA metric of a plurality of user equipments (UEs) comprising a first UE and a second UE having a lower channel gain than the first UE; generating, based on the OMA metric and the NOMA metric, a protocol instruction that indicates an OMA transmission or a NOMA transmission; and transmitting, based on the protocol instruction, a first data signal and a first control signal associated with the first UE, and a second data signal and a second control signal associated with the second UE. In response to the protocol instruction indicating the NOMA transmission, the first data signal and the second data signal are power multiplexed via NOMA, and the first control signal and the second control signal indicate the first data signal and the second data signal are transmitted via NOMA.

Example 62 includes the subject matter of example 61, wherein transmitting the second control signal comprises indicating a power scaling factor of the second data signal.

Example 63 includes the subject matter of example 61, wherein transmitting the first control signal comprises indicating a power scaling factor of the first data signal.

Example 64 includes the subject matter of example 61, wherein transmitting the first control signal comprises indicating a modulation and coding scheme (MCS) of the second data signal.

Example 65 includes the subject matter of example 61, wherein transmitting the first control signal comprises transmitting an identifier of the second UE.

Example 66 is an Evolved NodeB (eNB), comprising: means for storing executable instructions, means for processing, and means for transmitting. The means for processing are configured to execute the executable instructions to at least: evaluate an orthogonal multiple access (OMA) metric and a non-orthogonal multiple access (NOMA) metric of a plurality of user equipments (UEs) comprising a first UE and a second UE having a lower channel gain than the first UE; generate, based on the OMA metric and the NOMA metric, a protocol instruction that indicates an OMA transmission or a NOMA transmission; and determine a first modulation and coding scheme (MCS) for the first UE and a second MCS for the second UE. The means for transmitting are configured to receive the protocol instruction and to transmit, in response thereto, a first data signal and a first downlink control information (DCI) message associated with the first UE, and a second data signal and a second DCI message associated with the second UE. In response to the protocol instruction indicating the NOMA transmission, the first data signal and the second data signal are power multiplexed, the first DCI message and the second DCI message indicate the first data signal and the second data signal are transmitted via NOMA, and the first DCI message indicates the second MCS.

Example 67 is a user equipment (UE), comprising: means for receiving, means for processing, and means for interference cancellation. The means for receiving are coupled to at least one antenna and configured to receive a physical downlink control channel (PDCCH) transmission comprising a downlink control information (DCI) message and to receive a physical downlink shared channel (PDSCH) transmission comprising a first data signal and a second data signal. The means for processing are operably coupled to the antenna port and configured to decode the second data signal to obtain a decoded second data signal and to determine, based on the DCI message, whether the PDSCH transmission is an orthogonal multiple access (OMA) transmission or a non-orthogonal multiple access NOMA transmission, wherein, in response to a determination that the PDSCH transmission is the NOMA transmission, the means for processing are configured to determine whether the DCI message indicates a first reception protocol or a second reception protocol distinct from the first reception protocol. The means for interference cancellation are operably coupled to the antenna port and configured to employ interference cancellation according to at least one of a codeword level or a symbol level. In response to a determination that the DCI message indicates the first reception protocol, the means for interference cancellation are configured to employ the interference cancellation to subtract the decoded second data signal from the PDSCH transmission to obtain the first data signal, and the means for processing are configured to decode the first data signal as a received data signal. In response to a determination that the DCI message indicates the second reception protocol, the means for processing are configured to designate the decoded second data signal as the received data signal.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An Evolved NodeB (eNB), comprising:
a memory storing executable instructions;
a processor configured to execute the executable instructions to at least:
evaluate an orthogonal multiple access (OMA) metric and a non-orthogonal multiple access (NOMA) metric of a plurality of user equipments (UEs) comprising a first UE and a second UE having a lower channel gain than the first UE;
generate, based on the OMA metric and the NOMA metric, a protocol instruction that indicates an OMA transmission or a NOMA transmission; and
determine a first modulation and coding scheme (MCS) for the first UE and a second MCS for the second UE; and
a transmitter circuit configured to receive the protocol instruction and to transmit, in response thereto, a first data signal and a first downlink control information (DCI) message associated with the first UE, and a second data signal and a second DCI message associated with the second UE,
wherein, in response to the protocol instruction indicating the NOMA transmission, the first data signal and the second data signal are power multiplexed, the first DCI message and the second DCI message indicate the first data signal and the second data signal are transmitted via NOMA, and the first DCI message indicates the second MCS.

2. The eNB of claim 1, wherein the transmitter circuit is configured to transmit to the plurality of UEs, wherein the processor is further configured to execute the executable instructions to determine an individual OMA metric for each of the plurality of UEs and a pairwise NOMA metric for each of one or more pairs of UEs of the plurality of UEs, wherein the OMA metric is a best individual OMA metric of the individual OMA metrics, and wherein the NOMA metric is a best pairwise NOMA metric of the pairwise NOMA metrics.

3. The eNB of claim 1, wherein, in response to a determination that the second MCS includes amplitude-shift keying or amplitude modulation, a power scaling factor of the second data signal is indicated via at least one of the second DCI message or a radio resource control (RRC) signal that the transmitter circuit is configured to transmit.

4. The eNB of claim 1, wherein the processor is further configured to execute the executable instructions to determine a receiver type of the second UE, wherein, in response to a determination that the receiver type of the second UE is configured to employ channel amplitude information, the second DCI message indicates a modulation order of the first data signal, and a power scaling factor of the second data signal is indicated via at least one of the second DCI message or a radio resource control (RRC) signal that the transmitter circuit is configured to transmit.

5. The eNB of claim 1, wherein the processor is further configured to execute the executable instructions to determine an interference cancellation level of the first UE.

6. The eNB of claim 5, wherein, in response to a determination that the interference cancellation level is symbol level, the first data signal and the second data signal are scheduled to a distinct set of physical resource blocks (PRBs).

7. The eNB of claim 5, wherein, in response to a determination that the interference cancellation level is codeword level, the first data signal and the second data signal are scheduled to a common set of physical resource blocks (PRBs).

8. The eNB of claim 1, wherein the first DCI message indicates a power scaling factor of the first data signal in response to a determination that the MCS of the first data signal includes amplitude-shift keying or amplitude modulation.

9. A user equipment (UE), comprising:
an antenna port configured to couple to at least one antenna, wherein the antenna port is configured to receive a physical downlink control channel (PDCCH) transmission comprising a downlink control information (DCI) message and to receive a physical downlink shared channel (PDSCH) transmission comprising a first data signal and a second data signal;
a processor operably coupled to the antenna port and configured to decode the second data signal to obtain a decoded second data signal and to determine, based on the DCI message, whether the PDSCH transmission is an orthogonal multiple access (OMA) transmission or a non-orthogonal multiple access (NOMA) transmission, wherein, in response to a determination that the PDSCH transmission is the NOMA transmission, the processor is configured to determine whether the DCI message indicates a first reception protocol for the NOMA transmission or a second reception protocol for the NOMA transmission distinct from the first reception protocol; and
an interference cancellation component operably coupled to the antenna port and configured to employ interference cancellation according to at least one of a codeword level or a symbol level,
wherein, in response to a determination that the DCI message indicates the first reception protocol, the interference cancellation component is configured to employ the interference cancellation to subtract the decoded second data signal from the PDSCH transmission to obtain the first data signal, and the processor is configured to decode the first data signal as a received data signal, and
wherein, in response to a determination that the DCI message indicates the second reception protocol, the processor is configured to designate the decoded second data signal as the received data signal.

10. The UE of claim 9, wherein the DCI message indicates a power scaling factor of the second data signal, and wherein the processor is configured to decode the second data signal based at least in part on the power scaling factor of the second data signal.

11. The UE of claim 9, wherein, in response to the determination that the DCI message indicates the first reception protocol, the processor is configured to determine, based on the DCI message, a modulation order of the second data signal.

12. The UE of claim 9, wherein the interference cancellation component is configured to employ interference cancellation according to the symbol level, and wherein the DCI message indicates a first modulation and coding scheme (MCS) of the first data signal and a second MCS of the second data signal.

13. The UE of claim 9, wherein the interference cancellation component is configured to employ interference cancellation according to the codeword level, and in response to the determination that the DCI message indicates the first reception protocol, the processor is configured to determine a radio network temporary identity (RNTI) associated with the second data signal, wherein the processor is configured to decode the second data signal based at least in part on the RNTI associated with the second data signal.

14. The UE of claim 13, wherein the antenna port is further configured to receive a radio resource control (RRC) signal comprising a plurality of cell-RNTIs (C-RNTIs), wherein the processor is configured to determine the RNTI associated with the second data signal from among the plurality of C-RNTIs.

15. The UE of claim 14, wherein the processor is configured to attempt to decode the second data signal according to one or more of the plurality of C-RNTIs in order to determine the RNTI associated with the second data signal.

16. The UE of claim 14, wherein the processor is configured to determine, based on the DCI message, the RNTI associated with the second data signal from among the plurality of C-RNTIs.

17. The UE of claim 13, wherein the processor is configured to determine, based on the DCI message, the RNTI associated with the second data signal from among a plurality of NOMA-specific RNTIs.

18. The UE of claim 9, wherein, in response to the determination that the DCI message indicates the first reception protocol, the processor is configured to determine a NOMA channel quality indicator (CQI) based on the NOMA transmission and subtraction of the decoded second data signal, wherein the antenna port is configured to transmit the NOMA CQI.

19. A non-transitory machine readable medium comprising instructions that, when executed, cause an Evolved NodeB (eNB) to:
   determine a projected first data throughput of an orthogonal multiple access (OMA) protocol and a projected second data throughput of a non-orthogonal multiple access (NOMA) protocol;
   select, based on a comparison between the projected first data throughput and the projected second data throughput, the OMA protocol or the NOMA protocol as a selected protocol;
   determine, in response to selecting the NOMA protocol, a first power allocation ratio for a first UE and a second power allocation ratio for a second UE with a lower signal-to-interference-plus-noise ratio (SINR) than the first UE, wherein the second power allocation ratio is greater than the first power allocation ratio;
   transmit, via a physical downlink shared channel (PDSCH), a first data signal associated with the first UE according to a first transmission mode and a second data signal associated with the second UE according to a second transmission mode, wherein, in response to selecting the NOMA protocol, the first data signal and the second data signal are transmitted as a super-imposed signal comprising the first data signal according to the first power allocation ratio and the second data signal according to the second power allocation ratio; and
   transmit, via a physical downlink control channel (PDCCH), a first DCI message associated with the first UE and a second DCI message associated with the second UE, wherein the first DCI message and the second DCI message indicate the selected protocol, and wherein, in response to selecting the NOMA protocol, the first DCI message indicates a modulation and coding scheme (MCS) of the second data signal.

20. The non-transitory machine readable medium of claim 19, wherein the second DCI message indicates a modulation and coding scheme (MCS) of the first data signal.

21. The non-transitory machine readable medium of claim 19, wherein, in response to the first transmission mode comprising transmit diversity, the super-imposed signal is transmitted via transmit diversity over a pair of consecutive sub-carriers.

22. The non-transitory machine readable medium of claim 19, wherein, in response to the first transmission mode comprising spatial multiplexing, the super-imposed signal is transmitted via a single beam.

23. The non-transitory machine readable medium of claim 19, wherein the first DCI message indicates the first power allocation ratio.

24. The non-transitory machine readable medium of claim 19, wherein the second DCI message indicates the second power allocation ratio.

* * * * *